United States Patent
Kumar et al.

(10) Patent No.: US 7,465,362 B2
(45) Date of Patent: *Dec. 16, 2008

(54) PLASMA-ASSISTED NITROGEN SURFACE-TREATMENT

(75) Inventors: Devendra Kumar, Rochester Hills, MI (US); Satyendra Kumar, Troy, MI (US)

(73) Assignee: BTU International, Inc., N. Billerica, MA (US)

( * ) Notice: Subject to any disclaimer, the term of this patent is extended or adjusted under 35 U.S.C. 154(b) by 479 days.

This patent is subject to a terminal disclaimer.

(21) Appl. No.: 10/513,607

(22) PCT Filed: May 7, 2003

(86) PCT No.: PCT/US03/14036

§ 371 (c)(1), (2), (4) Date: Jul. 5, 2005

(87) PCT Pub. No.: WO03/096380

PCT Pub. Date: Nov. 20, 2003

(65) Prior Publication Data

US 2006/0162818 A1 Jul. 27, 2006

Related U.S. Application Data

(60) Provisional application No. 60/435,278, filed on Dec. 23, 2002, provisional application No. 60/430,677, filed on Dec. 4, 2002, provisional application No. 60/378,693, filed on May 8, 2002.

(51) Int. Cl.
C23C 8/36 (2006.01)
(52) U.S. Cl. ..................... 148/222
(58) Field of Classification Search ............... 148/222
See application file for complete search history.

(56) References Cited

U.S. PATENT DOCUMENTS 3,432,296 A    3/1969   McKinnon et al.

(Continued)

FOREIGN PATENT DOCUMENTS

DE    222 348 A1    5/1985

(Continued)

OTHER PUBLICATIONS

Willert-Porada, M., "Alternative Sintering Methods" 1 page Abstract dated Nov. 8, 2001, http://www.itap.physik.uni-stuttgart.de/~gkig/neu/english/welcome.php?/~gkig/neu/abstracts/abstract_willert-porada.html.

(Continued)

Primary Examiner—Roy King
Assistant Examiner—Jie Yang
(74) Attorney, Agent, or Firm—Weingarten, Schurgin, Gagnebin & Lebovici LLP

(57) ABSTRACT

Methods and systems (10) for plasma-assisted nitrogen surface-treatments are provided. The method can include subjecting a gas (24) to electromagnetic radiation (26) in the presence of a plasma catalyst (100, 120, 140) to initiate a plasma containing nitrogen. The surface region of an object can be exposed to the plasma for a period of time sufficient to transfer at least some of the nitrogen from the plasma to the object through the surface region.

26 Claims, 5 Drawing Sheets

U.S. PATENT DOCUMENTS

| | | | |
|---|---|---|---|
| 3,612,686 A | 10/1971 | Braman et al. |
| 3,731,047 A | 5/1973 | Mullen et al. |
| 4,004,934 A | 1/1977 | Prochazka |
| 4,025,818 A | 5/1977 | Giguere et al. |
| 4,090,055 A | 5/1978 | King |
| 4,147,911 A | 4/1979 | Nishitani |
| 4,151,034 A | 4/1979 | Yamamoto et al. |
| 4,213,818 A | 7/1980 | Lemons et al. |
| 4,230,448 A | 10/1980 | Ward et al. |
| 4,265,730 A | 5/1981 | Hirose et al. |
| 4,307,277 A | 12/1981 | Maeda et al. |
| 4,339,326 A | 7/1982 | Hirose et al. |
| 4,404,456 A | 9/1983 | Cann |
| 4,473,736 A | 9/1984 | Bloyet et al. |
| 4,479,075 A | 10/1984 | Elliott |
| 4,500,564 A | 2/1985 | Enomoto |
| 4,504,007 A | 3/1985 | Anderson, Jr. et al. |
| 4,609,808 A | 9/1986 | Bloyet et al. |
| 4,611,108 A | 9/1986 | Leprince et al. |
| 4,624,738 A | 11/1986 | Westfall et al. |
| 4,664,937 A | 5/1987 | Ovshinsky et al. |
| 4,666,775 A | 5/1987 | Kim et al. |
| 4,687,560 A | 8/1987 | Tracy |
| 4,698,234 A | 10/1987 | Ovshinsky |
| 4,760,230 A | 7/1988 | Hassler |
| 4,767,902 A | 8/1988 | Palaith et al. |
| 4,772,770 A | 9/1988 | Matsui et al. |
| 4,792,348 A | 12/1988 | Pekarsky |
| 4,840,139 A | 6/1989 | Takei |
| 4,871,581 A | 10/1989 | Yamazaki |
| 4,877,589 A | 10/1989 | O'Hare |
| 4,877,938 A | 10/1989 | Rau et al. |
| 4,883,570 A | 11/1989 | Efthimion et al. |
| 4,888,088 A | 12/1989 | Slomowitz |
| 4,891,488 A | 1/1990 | Davis et al. |
| 4,897,285 A | 1/1990 | Wilhelm |
| 4,908,492 A | 3/1990 | Okamoto et al. |
| 4,919,077 A | 4/1990 | Oda et al. |
| 4,924,061 A | 5/1990 | Labat et al. |
| 4,946,547 A | 8/1990 | Palmour et al. |
| 4,956,590 A | 9/1990 | Phillips |
| 4,963,709 A | 10/1990 | Kimrey, Jr. |
| 4,972,799 A | 11/1990 | Misumi et al. |
| 5,003,152 A | 3/1991 | Matsuo |
| 5,010,220 A | 4/1991 | Apte et al. |
| 5,017,404 A | 5/1991 | Paquet et al. |
| 5,023,056 A | 6/1991 | Aklufi et al. |
| 5,058,527 A | 10/1991 | Ohta et al. |
| 5,072,650 A | 12/1991 | Phillips |
| 5,074,112 A | 12/1991 | Walton et al. |
| 5,085,885 A | 2/1992 | Foley et al. |
| 5,087,272 A | 2/1992 | Nixdorf |
| 5,103,715 A | 4/1992 | Phillips |
| 5,120,567 A | 6/1992 | Frind et al. |
| 5,122,633 A | 6/1992 | Moshammer et al. |
| 5,131,993 A | 7/1992 | Suib et al. |
| 5,164,130 A | 11/1992 | Holcombe et al. |
| 5,202,541 A | 4/1993 | Patterson et al. |
| 5,223,308 A | 6/1993 | Doehler |
| 5,224,117 A | 6/1993 | Kruger et al. |
| 5,227,695 A | 7/1993 | Pelletier et al. |
| 5,271,963 A | 12/1993 | Eichman et al. |
| 5,276,297 A | 1/1994 | Nara |
| 5,276,386 A | 1/1994 | Watanabe et al. |
| 5,277,773 A | 1/1994 | Murphy |
| 5,284,544 A | 2/1994 | Mizutani et al. |
| 5,304,766 A | 4/1994 | Baudet et al. |
| 5,307,892 A | 5/1994 | Phillips |
| 5,310,426 A | 5/1994 | Mori |
| 5,311,906 A | 5/1994 | Phillips |
| 5,316,043 A | 5/1994 | Phillips |
| 5,321,223 A | 6/1994 | Kimrey, Jr. et al. |
| 5,349,154 A | 9/1994 | Harker et al. |
| 5,366,764 A | 11/1994 | Sunthankar |
| 5,370,525 A | 12/1994 | Gordon |
| 5,423,180 A | 6/1995 | Nobue et al. |
| 5,435,698 A | 7/1995 | Phillips |
| 5,449,887 A | 9/1995 | Holcombe et al. |
| 5,505,275 A | 4/1996 | Phillips |
| 5,514,217 A | 5/1996 | Niino et al. |
| 5,520,740 A | 5/1996 | Kanai et al. |
| 5,521,360 A | 5/1996 | Johnson et al. |
| 5,523,126 A | 6/1996 | Sano et al. |
| 5,527,391 A | 6/1996 | Echizen et al. |
| 5,536,477 A | 7/1996 | Cha et al. |
| 5,597,456 A | 1/1997 | Maruyama et al. |
| 5,607,509 A | 3/1997 | Schumacher et al. |
| 5,616,373 A | 4/1997 | Karner et al. |
| 5,645,897 A | 7/1997 | Andra |
| 5,651,825 A | 7/1997 | Nakahigashi et al. |
| 5,662,965 A | 9/1997 | Deguchi et al. |
| 5,670,065 A | 9/1997 | Bickmann et al. |
| 5,671,045 A | 9/1997 | Woskov et al. |
| 5,682,745 A | 11/1997 | Phillips |
| 5,689,949 A | 11/1997 | DeFreitas et al. |
| 5,712,000 A | 1/1998 | Wei et al. |
| 5,714,010 A | 2/1998 | Matsuyama et al. |
| 5,715,677 A | 2/1998 | Wallman et al. |
| 5,734,501 A | 3/1998 | Smith |
| 5,735,451 A | 4/1998 | Mori et al. |
| 5,741,364 A | 4/1998 | Kodama et al. |
| 5,755,097 A | 5/1998 | Phillips |
| 5,794,113 A | 8/1998 | Munir et al. |
| 5,796,080 A | 8/1998 | Jennings et al. |
| 5,808,282 A | 9/1998 | Apte et al. |
| 5,828,338 A | 10/1998 | Gerstenberg |
| 5,841,237 A | 11/1998 | Alton |
| 5,847,355 A | 12/1998 | Barmatz et al. |
| 5,848,348 A | 12/1998 | Dennis |
| 5,859,404 A | 1/1999 | Wei et al. |
| 5,868,871 A | 2/1999 | Yokose et al. |
| 5,874,705 A | 2/1999 | Duan |
| 5,904,993 A | 5/1999 | Takeuchi et al. |
| 5,939,026 A | 8/1999 | Seki et al. |
| 5,945,351 A | 8/1999 | Mathuni |
| 5,961,773 A | 10/1999 | Ichimura et al. |
| 5,961,871 A | 10/1999 | Bible et al. |
| 5,973,289 A | 10/1999 | Read et al. |
| 5,976,429 A | 11/1999 | Chen et al. |
| 5,980,843 A | 11/1999 | Silversand |
| 5,980,999 A | 11/1999 | Goto et al. |
| 5,989,477 A | 11/1999 | Berger |
| 5,993,612 A | 11/1999 | Rostaing et al. |
| 5,998,774 A | 12/1999 | Joines et al. |
| 6,011,248 A | 1/2000 | Dennis |
| 6,028,393 A | 2/2000 | Izu et al. |
| 6,038,854 A | 3/2000 | Penetrante et al. |
| 6,054,693 A | 4/2000 | Barmatz et al. |
| 6,054,700 A | 4/2000 | Rokhvarger et al. |
| 6,096,389 A | 8/2000 | Kanai |
| 6,101,969 A | 8/2000 | Niori et al. |
| 6,103,068 A | 8/2000 | Merten et al. |
| 6,122,912 A | 9/2000 | Phillips |
| 6,131,386 A | 10/2000 | Trumble |
| 6,132,550 A | 10/2000 | Shiomi |
| 6,149,985 A | 11/2000 | Grace et al. |
| 6,152,254 A | 11/2000 | Phillips |
| 6,153,868 A | 11/2000 | Marzat |
| 6,183,689 B1 | 2/2001 | Roy et al. |
| 6,186,090 B1 | 2/2001 | Dotter, II et al. |
| 6,189,482 B1 | 2/2001 | Zhao et al. |
| 6,204,606 B1 | 3/2001 | Spence et al. |
| 6,224,836 B1 | 5/2001 | Moisan et al. |
| 6,228,773 B1 | 5/2001 | Cox |

| | | | | | | |
|---|---|---|---|---|---|---|
| 6,238,629 B1 | 5/2001 | Barankova et al. | | JP | 62-000535 A | 1/1987 |
| 6,248,206 B1 | 6/2001 | Herchen et al. | | JP | 04-74858 A | 3/1992 |
| 6,264,812 B1 | 7/2001 | Raaijmakers et al. | | JP | 06-345541 A | 12/1994 |
| 6,284,202 B1 | 9/2001 | Cha et al. | | JP | 07-153405 A | 6/1995 |
| 6,287,980 B1 | 9/2001 | Hanazaki et al. | | JP | 08-217558 A | 8/1996 |
| 6,287,988 B1 | 9/2001 | Nagamine et al. | | JP | 08-281423 A | 10/1996 |
| 6,297,172 B1 | 10/2001 | Kashiwagi | | JP | 09-017597 A | 1/1997 |
| 6,297,595 B1 | 10/2001 | Stimson et al. | | JP | 09-023458 A | 1/1997 |
| 6,329,628 B1 | 12/2001 | Kuo et al. | | JP | 09-027459 A | 1/1997 |
| 6,342,195 B1 | 1/2002 | Roy et al. | | JP | 09-027482 A | 1/1997 |
| 6,345,497 B1 | 2/2002 | Penetrante | | JP | 09-078240 A | 3/1997 |
| 6,348,158 B1 | 2/2002 | Samukawa | | JP | 09-102400 A | 4/1997 |
| 6,358,361 B1 | 3/2002 | Matsumoto | | JP | 09-102488 A | 4/1997 |
| 6,362,449 B1 | 3/2002 | Hadidi et al. | | JP | 09-111461 A | 4/1997 |
| 6,365,885 B1 | 4/2002 | Roy et al. | | JP | 09-137274 A | 5/1997 |
| 6,367,412 B1 | 4/2002 | Ramaswamy et al. | | JP | 09-157048 A | 6/1997 |
| 6,370,459 B1 | 4/2002 | Phillips | | JP | 09-223596 A | 8/1997 |
| 6,372,304 B1 | 4/2002 | Sano et al. | | JP | 09-235686 A | 9/1997 |
| 6,376,027 B1 | 4/2002 | Lee et al. | | JP | 09-251971 A | 9/1997 |
| 6,383,333 B1 | 5/2002 | Haino et al. | | JP | 09-295900 A | 11/1997 |
| 6,383,576 B1 | 5/2002 | Matsuyama | | JP | 10-066948 A | 3/1998 |
| 6,388,225 B1 | 5/2002 | Blum et al. | | JP | 10-081588 A | 3/1998 |
| 6,392,350 B1 | 5/2002 | Amano | | JP | 10-081970 A | 3/1998 |
| 6,407,359 B1 | 6/2002 | Lagarde et al. | | JP | 10-087310 A | 4/1998 |
| 6,488,112 B1 | 12/2002 | Kleist | | JP | 10-204641 A | 8/1998 |
| 6,512,216 B2 | 1/2003 | Gedevanishvili et al. | | JP | 10-259420 A | 9/1998 |
| 6,522,055 B2 | 2/2003 | Uemura et al. | | JP | 10-294306 A | 11/1998 |
| 6,575,264 B2 | 6/2003 | Spadafora | | JP | 11-031599 A | 2/1999 |
| 6,592,664 B1 | 7/2003 | Frey et al. | | JP | 11-106947 A | 4/1999 |
| 6,610,611 B2 | 8/2003 | Liu et al. | | JP | 11-145116 A | 5/1999 |
| 6,712,298 B2 | 3/2004 | Kohlberg et al. | | JP | 11-186222 A | 7/1999 |
| 6,717,368 B1 | 4/2004 | Sakamoto et al. | | JP | 11-228290 A | 8/1999 |
| 6,870,124 B2 | 3/2005 | Kumar et al. | | JP | 11-265885 A | 9/1999 |
| 2001/0027023 A1 | 10/2001 | Ishihara et al. | | JP | 11-273895 A | 10/1999 |
| 2001/0028919 A1 | 10/2001 | Liu et al. | | JP | 11-297266 A | 10/1999 |
| 2002/0034461 A1 | 3/2002 | Segal | | JP | 2000-012526 A | 1/2000 |
| 2002/0036187 A1 | 3/2002 | Ishll et al. | | JP | 2000-173989 A | 6/2000 |
| 2002/0124867 A1 | 9/2002 | Kim et al. | | JP | 2000-203990 A | 7/2000 |
| 2002/0135308 A1 | 9/2002 | Janos et al. | | JP | 2000-269182 A | 9/2000 |
| 2002/0140381 A1 | 10/2002 | Golkowski et al. | | JP | 2000-288382 A | 10/2000 |
| 2002/0190061 A1 | 12/2002 | Gerdes et al. | | JP | 2000-306901 A | 11/2000 |
| 2002/0197882 A1 | 12/2002 | Niimi et al. | | JP | 2000-310874 A | 11/2000 |
| 2003/0071037 A1 | 4/2003 | Sato et al. | | JP | 2000-310876 A | 11/2000 |
| 2003/0111334 A1 | 6/2003 | Dodelet et al. | | JP | 2000-317303 A | 11/2000 |
| 2003/0111462 A1 | 6/2003 | Sato et al. | | JP | 2000-323463 A | 11/2000 |
| 2004/0001295 A1 | 1/2004 | Kumar et al. | | JP | 2000-348897 A | 12/2000 |
| 2004/0004062 A1 | 1/2004 | Kumar et al. | | JP | 2001-013719 A | 1/2001 |
| 2004/0070347 A1 | 4/2004 | Nishida et al. | | JP | 2001-053069 A | 2/2001 |
| 2004/0089631 A1 | 5/2004 | Blalock et al. | | JP | 2001-058127 A | 3/2001 |
| 2004/0107796 A1 | 6/2004 | Kumar et al. | | JP | 2001-093871 A | 4/2001 |
| 2004/0107896 A1 | 6/2004 | Kumar et al. | | JP | 2001-149754 A | 6/2001 |
| 2004/0118816 A1 | 6/2004 | Kumar et al. | | JP | 2001-149918 A | 6/2001 |
| 2006/0062930 A1* | 3/2006 | Kumar et al. ............. 427/569 | | JP | 2001-196420 A | 7/2001 |
| | | | | JP | 2001-303252 A | 10/2001 |
| FOREIGN PATENT DOCUMENTS | | | | JP | 2001-332532 A | 11/2001 |
| DE | 195 42 352 A1 | 5/1997 | | JP | 2001-351915 A | 12/2001 |
| DE | 100 05 146 A1 | 8/2001 | | JP | 2002-022135 A | 1/2002 |
| EP | 0 335 675 A2 | 10/1989 | | JP | 2002-028487 A | 1/2002 |
| EP | 0 228 864 B1 | 3/1991 | | JP | 2002-069643 A | 3/2002 |
| EP | 0 420 101 A2 | 4/1991 | | JP | 2002-075960 A | 3/2002 |
| EP | 0 435 591 A | 7/1991 | | JP | 2002-126502 A | 5/2002 |
| EP | 0 436 361 A1 | 7/1991 | | JP | 2002-273161 A | 9/2002 |
| EP | 0 520 719 B1 | 5/1996 | | JP | 2002-273168 A | 9/2002 |
| EP | 0 670 666 B1 | 6/1998 | | JP | 2003-075070 A | 3/2003 |
| EP | 0 724 720 B1 | 5/2000 | | JP | 2003-264057 A | 9/2003 |
| EP | 1 093 846 A1 | 4/2001 | | WO | WO 95-11442 A1 | 4/1995 |
| EP | 1 427 265 A2 | 6/2004 | | WO | WO 96/06700 A1 | 3/1996 |
| JP | 56-140021 A2 | 11/1981 | | WO | WO 96/38311 A1 | 12/1996 |
| JP | 57-119164 A2 | 7/1982 | | WO | WO 97-13141 A1 | 4/1997 |
| JP | 58-025073 A | 2/1983 | | WO | WO 01-55487 A2 | 8/2001 |
| JP | 58163440 A * | 9/1983 | | WO | WO 01-58223 A1 | 8/2001 |
| JP | 59-169053 A | 9/1984 | | WO | WO 01-82332 A1 | 11/2001 |
| | | | | WO | WO 02-26005 A1 | 3/2002 |

| | | |
|---|---|---|
| WO | WO 02-061165 A1 | 8/2002 |
| WO | WO 02-061171 A1 | 8/2002 |
| WO | WO 02-062114 A1 | 8/2002 |
| WO | WO 02-062115 A1 | 8/2002 |
| WO | WO 02-067285 A2 | 8/2002 |
| WO | WO 02-067285 A3 | 8/2002 |
| WO | WO 03-018862 A2 | 3/2003 |
| WO | WO 03-018862 A3 | 3/2003 |
| WO | WO 03-028081 A2 | 4/2003 |
| WO | WO 03-069770 A1 | 11/2003 |
| WO | WO 03-095058 A2 | 11/2003 |
| WO | WO 03-095089 A1 | 11/2003 |
| WO | WO 03-095090 A1 | 11/2003 |
| WO | WO 03-095130 A1 | 11/2003 |
| WO | WO 03-095591 A1 | 11/2003 |
| WO | WO 03-095699 A1 | 11/2003 |
| WO | WO 03-095807 A1 | 11/2003 |
| WO | WO 03-096369 A1 | 11/2003 |
| WO | WO 03-096370 A1 | 11/2003 |
| WO | WO 03-096380 A2 | 11/2003 |
| WO | WO 03-096381 A2 | 11/2003 |
| WO | WO 03-096382 A2 | 11/2003 |
| WO | WO 03-096383 A2 | 11/2003 |
| WO | WO 03-096747 A2 | 11/2003 |
| WO | WO 03-096749 A1 | 11/2003 |
| WO | WO 03-096766 A1 | 11/2003 |
| WO | WO 03-096768 A1 | 11/2003 |
| WO | WO 03-096771 A1 | 11/2003 |
| WO | WO 03-096772 A1 | 11/2003 |
| WO | WO 03-096773 A1 | 11/2003 |
| WO | WO 03-096774 A1 | 11/2003 |
| WO | WO 2004-050939 A2 | 6/2004 |

OTHER PUBLICATIONS

Accentus Corporate Overview, 3 pages—http://www.accentus.co.uk/ipco/html/techenv6_txt_fr.html (2003).

Agrawal et al., "Grain Growth Control in Microwave Sintering of Ultrafine WC-Co Composite Powder Compacts," Euro PM99 Conference, Sintering, Turino, Italy, 8 pages (1999).

Agrawal, "Metal Parts from Microwaves," *Materials World* 7(11):672-673 (1999).

Agrawal et al., "Microwave Sintering of Commercial WC/Co Based Hard Metal Tools," Euro PM99 Conference, Sintering, Turino, Italy, 8 pages (1999).

Agrawal, "Microwave Processing of Ceramics," *Current Opinion in Solid State and Materials Science* 3:480-485 (Oct. 1998).

Air Liquide, "Heat Treatment—Gas Quenching,"—http://www.airliquide.com/en/business/industry/metals/applications/heat_treatment/quenching.asp, 1 page (2000).

Alexander et al., "Electrically Conductive Polymer Nanocomposite Materials," AFRL's Materials and Manufacturing Directorate, Nonmetallic Materials Division, Polymer Branch, Wright-Patterson AFB OH—http://www.afrlhorizons.com/Briefs/Sept02/ML0206.html , 2 pages (Sep. 2002).

Al-Shamma'A et al., "Microwave Atmospheric Plasma for Cleaning Exhaust Gases and Particulates," Future Car Congress, Washington, Jun. 3-5, 2002 (1 page).

Alton et al., "A High-Density, RF Plasma-Sputter Negative Ion Source," The 8th Intl. Conf. on Heavy-Ion Accelerator Technology, Argonne Natl. Lab., Oct. 5-9, 1998, Poster Presentation (3 pages).

Anklekar et al., "Microwave Sintering and Mechanical Properties of PM Copper Steel," *Powder Metallurgy* 44(4):355-362 (2001).

Batanov et al., "Plasmachemical Deposition of Thin Films in a Localized Free-Space Microwave Discharge," *Technical Physics* 38(6):475-479 (Jun. 1993).

"Carbonitriding," Treat All Metals, Inc., 2 pages—http://www.treatallmetals.com/carbon.htm.

"Carburizing," Treat All Metals, Inc.—http://www.treatallmetals.com/gas.htm, 2 pages.

Cheng, J., "Fabricating Transparent Ceramics by Microwave Sintering," *Am. Ceramic Soc. Bull.* 79(9):71-74 (2000).

Cheng et al., "Microwave Processing of WC-Co Composites And Ferroic Titanates" *Mat. Res. Innovat.* 1(1):44-52 (Jun. 1997).

Circle Group Holdings, Inc., "StarTech Environmental Corp."—http://www.crgq.com/cgiweb/HTML/eMentor_Companies/startech.html, 9 pages.

"Classification of Cast Iron"—Key to Steel—Article—http://www.key-to-steel.com/Articles/Art63.htm, 3 pages (1999).

Collin, in: *Foundations for Microwave Engineering*, 2d Ed., IEEE Press, NY, pp. 180-192 (2001).

"Controlled Atmospheres Sinter-Hardening,," Sarnes Ingenieure, 2 pages, http://www.space-ctrl.de/de/2002/06/399.php (2002).

Egashira et al., "Decomposition of Trichloroethylene by Microwave-Induced Plasma Generated from SiC Whiskers," *J. Electrochem. Soc.*, 145(1):229-235 (Jan. 1998).

Ford 1.3L Catalytic Converter (1988-1989) product description—http://catalyticconverters.com/FO13L43778889.html, 1 page, Undated.

Ford Contour Catalytic Converter (1995-1996) product description—http://www.all-catalytic-converters.com/ford-contour-converter.html, 2 pages, Undated.

Fraunhofer ILT, "Plasma-Reactors for Aftertreatment of Automobile Exhaust Gas," Fraunhofer Gesellschaft—http://www.ilt.fhg.de/eng/jb01-s35.html, 1 page (2002).

French, "The Plasma Waste Converter—From Waste Disposal to Energy Creation," The International Chemical Weapons Demilitarization Conference, Gifu City, Japan.(May 22-24, 2001)—http://www.arofe.army.mil/Conferences/CWC2001/French.htm, 1 page.

Gao et al., "Superfast Densification of Oxide/Oxide Ceramic Composites," *J. Am. Ceram. Soc.* 82(4)1061-1063 (1999).

Gedevanishvili et al., "Microwave Combustion Synthesis And Sintering of Intermetallics and Alloys," *J. Mat. Sci. Lett.* 18(9):665-668 (1999).

General Eastern, "Semiconductor Manufacturing—Using the HygroTwin 2850 to Reduce Costs, Improve Quality,", 3 pages, www.generaleastern.net (1997).

George, "The Catalytic Converter," 5 pages, (2002)—http://krioma.net/articles/Catalytic%20Converter/Catalytic%20Converter.htm.

GlassTesseract.Org website, "Tech Procedures and Tips: Exhaust Manifolds and Catalytic Converters Removal—and Installation", 4 pages (2003). http://glasstesseract.org/tech/catalytic.html.

*Hackh's Chemical Dictionary*, 3rd edition, J. Grant, Ed., McGraw Hill Book Co., NY, pp. 174-175 (1944).

"Heat Treatment of Steels—The Processes," AZoM.com, 9 pages, (2002)—www.azom.com.

"Powder Metallurgy—Overview of the Powder Metallurgy Process," AZoM.com, 3 pages (2002)—http://www.azom.com/details.asp?ArticleID=1414.

Honda Automobile News Press Release, "Honda Introduces Its First Two Clean Air Vehicles, the Civic Ferio LEV and Partner 1.6 LEV," 3 pages (Feb. 1997)—http://world.honda.com/news/1997/4970217a.html.

Honda Civic CX Catalytic Converter, (1996-2000) 1 page—http://www.catalyticconverters.com/HOCIVICCX4349600.html, Undated.

"How A Blast Furnace Works—The Blast Furnace Plant," AISI Learning Center, 7 pages. http://www.steel.org/learning/howmade/blast_furnace.htm., Undated.

"How Is Steel Made," Answer Discussion, 6 pages—http://ourworld.compuserve.com/homepages/Dyaros/stlmanuf.htm, Undated.

Hsu et al., "Palladium-Coated Kieselguhr for Simultaneous Separation and Storage of Hydrogen," Westinghouse Savannah River Company, U.S. Dept. of Commerce, National Technical Information Service, 14 pages (2001).

Fincke, "Hydrogen Separation Membrane,—Advanced Gas Separation: H2 Separation," Summary of research proposal, 1 page (2003).

"IRC in Materials Processing: Advanced Melting, Atomisation, Powder and Spray Forming, Plasma Melting—Operation of a Plasma Furnace," University of Birmingham website, 3 pages—http://www.irc.bham.ac.uk/theme1/plasma/furnace.htm, Undated.

Saville, in: *Iron and Steel*, Chapter 6, pp. 16-22, Wayland Publ., England (1976).

Japanese Advanced Environment Equipment, "Mitsubishi Graphite Electrode Type Plasma Furnace," 3 pages, Undated—http://nett21.unep.or.jp/JSIM_DATA/WASTE/WASTE_3/html/Doc_467.html.

Johnson, Faculty Biography webpage, Dept. of Materials Science & Engineering, Northwestern University, 2 pages—http://www.matsci.northerwestern.edu/faculty/ dlj.html, Undated.

Kalyanaraman et al., "Synthesis and Consolidation of Iron Nanopowders," *NanoStructured Materials* 10(8):1379-1392 (1998).

Karger, Scientific Staff Research Areas for KTP Company, 2 pages (Nov. 2002)—http://wwwfb10.upb.de/KTP/KTP-ENG/Staff/Karger/body_karger.html.

Kong et al., "Nuclear-Energy-Assisted Plasma Technology for Producing Hydrogen," Nuclear Energy Research Initiative Research Proposal, 4 pages (2002).

Lewis, in: *Hawley's Condensed Chemical Dictionary*, 12th ed., pp. 230-232, Van Nostrand Reinhold, NY (1993).

Lucas, "Welding Using Microwave Power Supplies," Faculty webpage, 1 page—http://www.liv.ac.uk/EEE/research/cer/project6.htm, Undated.

Luggenholscher, et al., "Investigations on Electric Field Distributions in a Microwave Discharge in Hydrogen," Institute fur Laser- und Plasmaphysik, Univsitat Essen, Germany, 4 pages, Undated.

March Plasma Systems, product descriptions, 2 pages (2002)—http://www.marchplasma.com/micro_app.htm, Undated.

"Micro-fabricated Palladium-Silver Membrane for Hydrogen Separation and Hydro/Dehydrogenation Reactions," Research Education Group webpage, 5 pages—http://utep.el.utwente.nl/tt/projects/sepmem/—Undated.

Ahmed et al., "Microwave Joining of Alumina and Zirconia Ceramics," IRIS Research Topics 1998, 1 page (1988).

"Microwave Welding," EWi WeldNet, 1 page—(2003) http://www.ferris.edu/cot/accounts/plastics/ htdocs/Prey/Microwave%20Homepage.htm.

"Microwave Welding of Plastics," TWI World Centre for Materials Joining Technology, 2 pages, (Aug. 2002)—http://www.twi.co.uk/j32k/protected/band_3/ksab001.htm.

"Microwave Welding," Welding and Joining Information Network, 3 pages (Nov. 2002)—http://www.ewi.org/technologies/plastics/microwave.asp.

Moss et al., "Experimental Investigation of Hydrogen Transport Through Metals," Experiment Description, Los Alamos National Library, 5 pages—Undated. http://www.education.lanl.gov/RESOURCES/h2/dye/education.html.

"Nitriding," Treat All Metals, Inc., 2 pages—Undated—http://www.treatallmetals.com/nitrid.htm..

Thomas et al., "Non-Thermal Plasma Aftertreatment of Particulates—Theoretical Limits and Impact on Reactor Design," SAE Spring Fuels and Lubes Conference, Paris, France, 27 pages—Jun. 19-22, 2000—http://www.aeat.co.uk/electrocat/sae/saepaper.htm.

"Using Non-Thermal Plasma Reactor to Reduce NOx Emissions from CIDI Engines," Office of Energy Efficiency and Renewable Energy, Office of Transportation, 1 page (Apr. 1999).

"Optoelectronic Packaging Applications," March Plasma Systems, Product Description, 2 pages (2002)—http://www.marchplasma.com/opto_app.htm.

Paglieri et al., "Palladium Alloy Composite Membranes for Hydrogen Separation," 15th Annual Conf. Fossil Energy Matter, Knoxville, TN (2001), 5 pages.

Peelamedu et al., "Anisothermal Reaction Synthesis of Garnets, Ferrites, and Spinels In Microwave Field," *Materials Research Bulletin* 36:2723-2739 (Dec. 2001).

PerfectH2 PE8000 Series Product Description, Palladium Diffusion Hydrogen Purifier For High Flow Rate MOCVD Applications, Matheson Tri.Gas, 2 pages (2002).

Photonics Directory, Definition for Thyratron, (Laurin Publishing), 2 pages http://www.photonics.com/dictionary/.

Pingel, "About What Every P/A Should Know About P/M," Powder Metallurgy Co., 9 pages—http://www.powdermetallurgyco.com/pm_about.htm.

"Plasma Applications," Coalition for Plasma Science, 2 pages (1999, 2000)—http://www.plasmacoalition.org/applications.htm.

"Plasma Carburizing," 1 page—Undated, http://www.ndkinc.co.jp/ndke04.html.

"Plasma Direct Melting Furnace," Materials Magic, Hitachi Metals Ltd., 3 pages—Undated, http://www.hitachi-metals.co.jp/e/prod/prod07/p07_2_02.html.

"Classical Plasma Applications," 2 pages (2002)—http://www.plasma.iinpe.br/English/Classical_Applications.htm.

"Plasma Nitride Process Description," Northeast Coating Technologies, 2 pages, Undated, www.northeastcoating.com.

Plasma Science and Technology, "Plasmas for Home, Business and Transportation," 4 pages—Undated. http://www.plasmas.org/rot-home.htm.

"Novel Plasma Catalysts Significantly Reduce NOx from Diesel Engines," US Department of Energy research summary, 2 pages (Apr. 2001)—http://www.ott.doe.gov/success.html.

"Printed Circuit Board (PCB) Plasma Applications," March Plasma Systems product descriptions, 2 pages (2002)—http://www.marchplasma.com/pcb_app.01.htm.

Roy et al., "Definitive Experimental Evidence for Microwave Effects: Radically New Effects of Separated E and H Fields, Such As Decrystallization of Oxides in Seconds," *Materials Research Innovations* 6(3):129-140 (2002).

Roy et al., "Full Sintering of Powdered-Metal Bodies In A Microwave Field," *Nature* 399:668-670 (Jun. 17, 1999).

Roy et al., "Major phase transformations and magnetic property changes caused by electromagnetic fields at microwave frequencies," *J. Mat. Res.* 17(12):3008-3011 (2002).

Roy et al., "Microwave Processing: Triumph of Applications-Driven Science in WC-Composites And Ferroic Titanates," *Ceramic Transactions* 80:3-26, (1997).

Rusanov, Introduction to the Hydrogen Energy & Plasma Technologies Institute: Russian Research Centre Kurchatov Institute, 13 pages, Undated—http://www.kiae.ru/eng/str/ihept/oiivept.htm.

Samant et al., "Glow Discharge Plasma Nitriding of Al 6063 Samples and Study of Their Surface Hardness," *Metallofiz. Noveishe Tekhnol.* 23(3):325-333 (2001).

Sato et al., "Surface Modification of Pure Iron by rf Plasma Nitriding with dc Bias Voltage Impression," *Hyomen Gijutsu* 48(3):317-323 (1997) (English Abstract).

Saveliev et al., "Effect of Cathode End Caps and a Cathode Emissive Surface on Relativistic Magnetron Operation," *IEEE Transactions on Plasma Science* 28:3.478-484 (Jun. 2000).

SC/Tetra Engine Manifold Application, 2 pages (2001)—http://www.sctetra.com/applications/01_manifold.htm.

Shulman, "Microwaves In High-Temperature Processes," GrafTech Intl. Ltd., 8 pages (Mar. 2003) http://www.industrialheating.com/CDA/ArticleInformation/features/BNP_Features_Item/0.2832.94035.00.html.

Slone et al., "NOx Reduction For Lean Exhaust Using Plasma Assisted Catalysis," Noxtech Inc., 5 pages (2000)—http://www.osti.gov/fcvt/deer2000/bhattpa.pdf.

Stockwell Rubber Company, Inc., "Conductive Silicone Rubber Compounds Product Selection Guide," Electrically Conducive Materials Chart, 3 pages, Undated—http://www.stockwell.com/electrically_conducive_produc.htm.

Sumitomo Heavy Industries, Ltd., "Spark Plasma Sintering," 3 pages (2001)—http://www.shi.co.jp/sps/eng/.

"Surface Hardening" Services Description for AHS Corp., 5 pages, Undated—http://www.ahscorp.com/surfaceh.html.

Takizawa et al. "Synthesis of inorganic materials by 28 GHz Microwave Irradiation," *Transactions of the Materials Research Society of Japan* 27(1):51-54 (2002).

Taube et al., "Advances in Design of Microwave Resonance Plasma Source," American Institute of Chemical Engineering, 2004 Annual Meeting, Presentation (Nov. 2004).

"testMAS: Pressure Sintering," 11 pages, Undated—http://cybercut.berkley.edu/mas2/processes/sinter_pressure.

Wolf et al., "The Amazing Metal Sponge: Simulations of Palladium-Hydride," 2 pages, Undated—http://www.psc.edu/science/Wolf/Wolf.html.

Toyota Motor Sales, "Emission Sub Systems—Catalytic Converter," 10 pages, Undated.

Uchikawa et al., "New Technique of Activating Palladium Surface for Absorption of Hydrogen or Deuterium," *Japanese J. Appl. Phys.* 32:5095-5096, Part 1, No. 11A (Nov. 1993).

Wang et al., "Densification of $Al_2O_3$ Powder Using Spark Plasma Sintering," *J. Mater. Res.*, 15(4):982-987 (Apr. 2000).

Way et al., "Palladium/Copper Alloy Composite Membranes for High Temperature Hydrogen Separation from Coal-Derived Gas Streams," Research Grant Report, Dept. of Chemical Engineering, Colorado School of Mines, 3 pages (1999).

Lucas, "Welding Breakthrough: Generating and Handling a Microwave Powered Plasma," Australian Industry News, Information & Suppliers, 7 pages (Sep. 2001)—http://www.industry/search.com.au/features/microwave.asp.

"Welding Plastic Parts," Business New Publishing Company, 4 pages (Nov. 2000)—http://www.assemblymag.com/Common/print_article.asp?rID=E455512C17534C31B96D.

Xie et al., "Effect of Rare Earths in Steels on the Thermochemical Treatments and the Functional Mechanisms of the Rare Earths," *Rare Metals Materials and Engineering* 26(1):52-55 (Feb. 1997) (English Abstract).

Yahoo Canada—Autos, "Catalytic Converter Answer2," 4 pages (2001)—http://ca.autos.yahoo.com/maintain/catalytic_converteranswer2.html.

International Search Report issued on Jul. 23, 2003, in PCT/US03/14037.

International Search Report issued on Aug. 15, 2003, in PCT/US03/14124.

International Search Report issued on Sep. 10, 2003, in PCT/US03/14132.

International Search Report issued on Aug. 14, 2003, in PCT/US03/14052.

International Search Report issued on Aug. 14, 2003, in PCT/US03/14054.

International Search Report issued on May 10, 2004, in PCT/US03/14036.

International Search Report issued on Aug. 9, 2003, in PCT/US03/14053.

International Search Report issued on Feb. 25, 2004, in PCT/US03/14034.

International Search Report issued on Sep. 19, 2003, in PCT/US03/14039.

International Search Report issued on Aug. 29, 2003, in PCT/US03/14038.

International Search Report issued on Dec. 30, 2003, in PCT/US03/14133.

International Search Report issued on Aug. 28, 2003, in PCT/US03/14035.

International Search Report issued on Jul. 29, 2003, in PCT/US03/14040.

International Search Report issued on Sep. 10, 2003, in PCT/US03/14134.

International Search Report issued on Aug. 29, 2003, in PCT/US03/14122.

International Search Report issued on Sep. 30, 2003, in PCT/US03/14130.

International Search Report issued on May 24, 2004, in PCT/US03/14055.

International Search Report issued on May 26, 2004, in PCT/US03/14137.

International Search Report issued on Aug. 29, 2003, in PCT/US03/14123.

International Search Report issued on Aug. 29, 2003, in PCT/US03/14121.

International Search Report issued on Sep. 16, 2003, in PCT/US03/14136.

International Search Report issued on May 25, 2004, in PCT/US03/14135.

Written Opinion issued on Apr. 13, 2004, in PCT/US03/014037.
Examination Report issued on Feb. 24, 2004, in PCT/US03/14054.
Written Opinion issued on Dec. 22, 2003, in PCT/US03/14053.
Examination Report issued on Apr. 26, 2004, in PCT/US03/14053.
Written Opinion issued on Dec. 22, 2003, in PCT/US03/14123.
Examination Report issued on Apr. 26, 2004, in PCT/US03/14123.
Quayle Action issued on Apr. 19, 2004, in U.S. Appl. No. 10/430,414.
Office Action issued on May 18, 2004, in U.S. Appl. No. 10/430,426.
Reply to Office Action filed on Nov. 18, 2004, in U.S. Appl. No. 10/430,426.
Office Action issued on Feb. 24, 2005, in U.S. Appl. No. 10/430,426.

\* cited by examiner

PLASMA-ASSISTED NITROGEN SURFACE-TREATMENT

CROSS-REFERENCE TO RELATED APPLICATIONS

Priority is claimed to U.S. Provisional Patent Application No. 60/378,693, filed May 8, 2002, No. 60/430,677, filed Dec. 4, 2002, and No. 60/435,278, filed Dec. 23, 2002, all of which are fully incorporated herein by reference.

FIELD OF THE INVENTION

This invention relates to surface-treatment systems and methods. More specifically, the invention relates to systems and methods for igniting, modulating, and sustaining plasmas in gases using plasma catalysts and for using the plasmas in nitrogen surface-treatment processes.

BACKGROUND

Various nitrogen surface-treatments (e.g., nitriding, carbonitriding, nitrocarburizing, etc.) are known as surface hardening processes. These processes can involve diffusing varying levels of nitrogen into a variety of ferrous alloys (e.g., steels) to form nitrogen-rich surfaces. The diffused nitrogen can react with alloys of steel to enhance surface hardness. Nitrogen surface-treatments may result in a component that has a high surface hardness and a softer core. Nitrogen surface-treatments, therefore, may be useful for treating high wear components such as gears and shafts. Additionally, nitrogen surface-treatments may improve the fatigue life and the corrosion resistance of a component.

In most nitrogen surface-treatment processes, for example, the depth of diffusion of nitrogen into the steel may be controlled by the temperature of the component and the time of exposure to a gaseous environment containing nitrogen. Most often, a part to be treated is heated in a furnace to a desired temperature in an environment including nitrogen. One significant advantage of certain nitrogen surface-treatments, including nitriding, is that the case hardness may be developed without quenching.

While known nitrogen surface-treatment methods may achieve acceptable surface hardness levels, these methods include several disadvantages. For example, a part may be treated in an atmospheric nitrogen-treatment oven. In such ovens, however, small or thin features of the part will generally heat faster than the remainder of the surface of the part. As a result, these features may exhibit a higher hardness than the rest of the part. Moreover, atmospheric ovens are generally slow and lack the ability to precisely control the temperature of the part.

Nitrogen surface-treatments may also be performed in a vacuum furnace. In this arrangement, the part may be placed in a vacuum chamber, which is then evacuated. The part is heated to a desired temperature and nitrogen, and optionally other gases, may be supplied to the vacuum chamber. While this method may produce surfaces with uniform hardness values, it can be costly and time-consuming to establish and maintain the required vacuum during the surface-treatment.

Nitrogen surface-treatments, including nitriding, for example, have also been performed by exposing the part to a plasma containing nitrogen. While plasma nitriding methods may offer potential increases in heating rates over traditional furnace nitriding methods, these plasma-assisted methods normally involve the use of costly vacuum equipment to establish the necessary vacuum environments.

The present invention solves one or more of the problems associated with known nitrogen surface-treatments.

SUMMARY OF THE INVENTION

One aspect of the invention may provide a plasma-assisted method of nitriding a surface region of an object. The method can include initiating a nitriding plasma by subjecting a gas to radiation (e.g., microwave radiation) in the presence of a plasma catalyst, where the plasma contains nitrogen, and exposing the surface region of the object to the plasma for a period of time sufficient to transfer at least some of the nitrogen from the plasma to the object through the surface region.

Another aspect of the invention may provide a method of surface hardening a first surface region of an object. The method can include initiating a plasma by subjecting a gas to radiation in the presence of a plasma catalyst, wherein the plasma contains both nitrogen and carbon, and exposing the surface region of the object to the plasma for a period of time sufficient to transfer at least some of the nitrogen and at least some of the carbon to the object through the surface region.

Yet another aspect of the invention may provide a system for plasma-assisted surface hardening of an object. The system can include a plasma catalyst, a vessel in which a cavity is formed and in which a plasma containing at least one of nitrogen and carbon can be ignited by subjecting a gas to radiation in the presence of the plasma catalyst, and a radiation source connected to the cavity for directing radiation into the cavity.

A number of plasma catalysts are also provided for plasma-assisted nitriding, carbonitriding, and nitrocarburizing consistent with this invention.

BRIEF DESCRIPTION OF THE DRAWINGS

Further aspects of the invention will be apparent upon consideration of the following detailed description, taken in conjunction with the accompanying drawings, in which like reference characters refer to like parts throughout, and in which.

DETAILED DESCRIPTION OF THE INVENTION

Methods and apparatus for plasma-assisted treatments of surfaces with nitrogen may be provided consistent with this invention. The plasmas can be ignited, as well as modulated and sustained, with a plasma catalyst consistent with this invention.

The following commonly owned, concurrently filed U.S. patent applications are hereby incorporated by reference in their entireties: U.S. patent application Ser. No. 10/513,221, U.S. patent application Ser. No. 10/513,393, PCT Application US03/14132, now expired, Ser. No. 10/513,394, U.S. patent application Ser. No. 10/513,305, U.S. patent application Ser. No. 10/449,600, PCT Application US03/14034, now expired, U.S. patent application Ser. No. 10/430,416, U.S. patent application Ser. No. 10/430,415, PCT Application US03/14133, now expired, U.S. patent application Ser. No. 10/513,606, U.S. patent application Ser. No. 10/513,309, U.S. patent application Ser. No. 10/513,220, PCT Application US03/14122, now expired, U.S. patent application Ser. No. 10/513,397, 10/513,605, PCT US03/14137, now expired, U.S. patent application Ser. No. 10/430,426, PCT Application US03/14121, now expired, U.S. patent application Ser. No. 10/513,604 and PCT Application US03/14135, now expired.

Illustrative Plasma System

Figure 1:
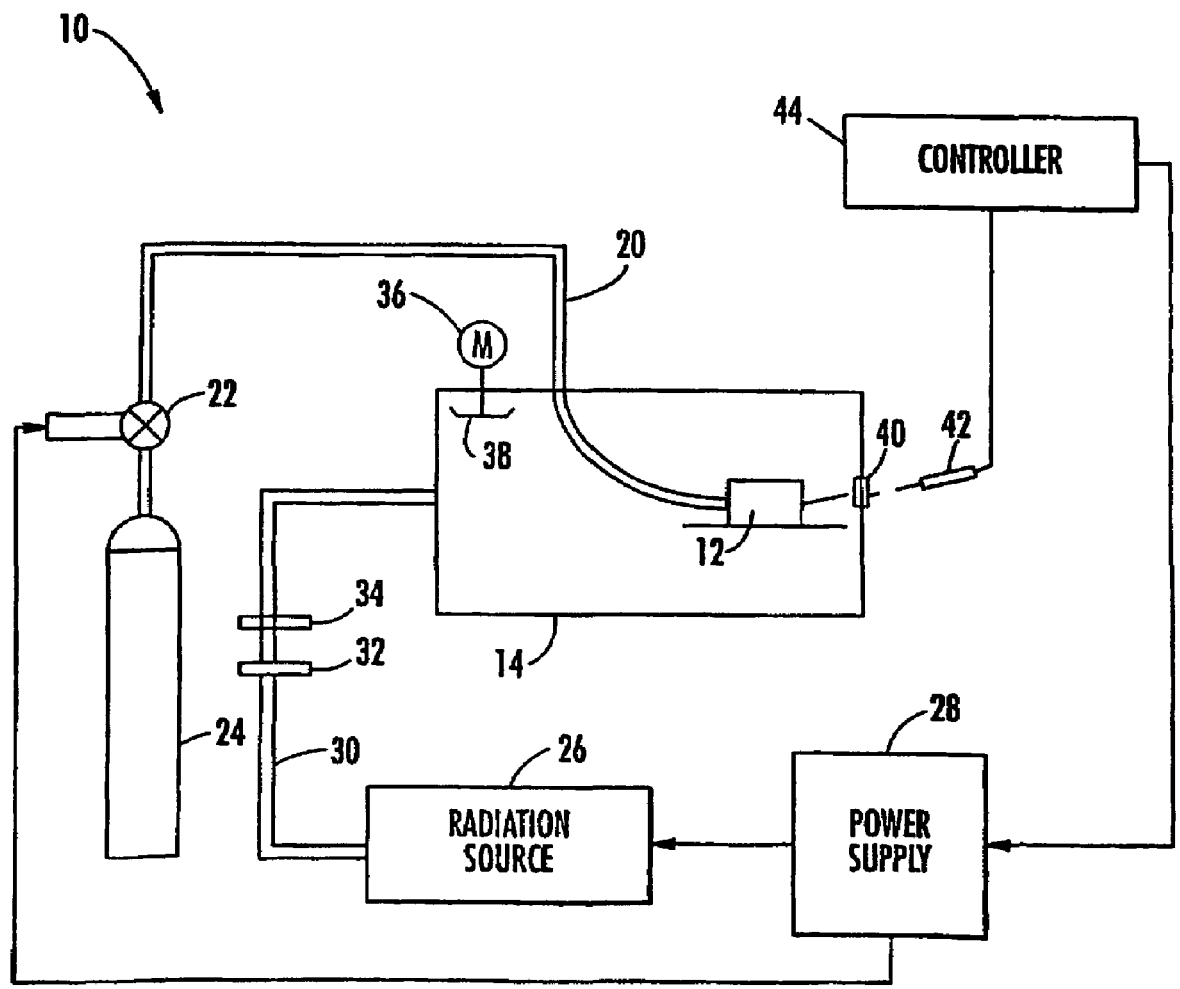
FIG. 1 shows a schematic diagram of an illustrative nitrogen plasma system consistent with this invention.

FIG. 1 illustrates an exemplary nitrogen surface-treatment system 10 consistent with one aspect of this invention. In this embodiment, cavity 12 is formed in a vessel that is positioned inside radiation chamber (i.e., applicator) 14. In another embodiment (not shown), vessel 12 and radiation chamber 14 are the same, thereby eliminating the need for two separate components. The vessel in which cavity 12 is formed can include one or more radiation-transmissive (e.g., microwave-transmissive) insulating layers to improve its thermal insulation properties without significantly shielding cavity 12 from the radiation.

In one embodiment, cavity 12 is formed in a vessel made of ceramic. Due to the extremely high temperatures that can be achieved with plasmas consistent with this invention, a ceramic capable of operating at a temperature greater than about 2,000 degrees Fahrenheit, such as about 3,000 degrees Fahrenheit, can be used. The ceramic material can include, by weight, 29.8% silica, 68.2% alumina, 0.4% ferric oxide, 1% titania, 0.1% lime, 0.1% magnesia, 0.4% alkalies, which is sold under Model No. LW-30 by New Castle Refractories Company, of New Castle, Pa. It will be appreciated by those of ordinary skill in the art, however, that other materials, such as quartz, and those different from the one described above, can also be used consistent with the invention. It will be appreciated that other embodiments of the invention may include materials intended to operate at temperatures below about 2,000 degrees Fahrenheit.

In one successful experiment, a plasma was formed in a partially open cavity inside a first brick and topped with a second brick. The cavity had dimensions of about 2 inches by about 2 inches by about 1.5 inches. At least two holes were also provided in the brick in communication with the cavity: one for viewing the plasma and at least one hole for providing a gas from which the plasma can be formed. The size and shape of the cavity can depend on the desired plasma process being performed. Also, the cavity should at least be configured to prevent the plasma from rising/floating away from the primary processing region.

Cavity 12 can be connected to one or more gas sources 24 (e.g., a source of argon, nitrogen, hydrogen, xenon, krypton) by line 20 and control valve 22, which may be powered by power supply 28. Line 20 may be any channel capable of conveying the gas but narrow enough to prevent significant radiation leakage. For example, line 20 may be tubing (e.g., having a diameter between about 1/16 inch and about 1/4 inch, such as about 1/8"). Also, if desired, a vacuum pump can be connected to the chamber to remove any undesirable fumes that may be generated during plasma processing.

A radiation leak detector (not shown) was installed near source 26 and waveguide 30 and connected to a safety interlock system to automatically turn off the radiation (e.g., microwave) power supply if a leak above a predefined safety limit, such as one specified by the FCC and/or OSHA (e.g., 5 mW/cm$^2$), was detected.

Radiation source 26, which may be powered by electrical power supply 28, directs radiation energy into chamber 14 through one or more waveguides 30. It will be appreciated by those of ordinary skill in the art that source 26 can be connected directly to chamber 14 or cavity 12, thereby eliminating waveguide 30. The radiation energy entering cavity 12 is used to ignite a plasma within the cavity. This plasma can be substantially sustained and confined to the cavity by coupling additional radiation, such as microwave radiation, with the catalyst.

Radiation energy can be supplied through circulator 32 and tuner 34 (e.g., 3-stub tuner). Tuner 34 can be used to minimize the reflected power as a function of changing ignition or processing conditions, especially before the plasma has formed because microwave power, for example, will be strongly absorbed by the plasma.

As explained more fully below, the location of radiation-transmissive cavity 12 in chamber 14 may not be critical if chamber 14 supports multiple modes, and especially when the modes are continually or periodically mixed. For example, motor 36 can be connected to mode-mixer 38 for making the time-averaged radiation energy distribution substantially uniform throughout chamber 14. Furthermore, window 40 (e.g., a quartz window) can be disposed in one wall of chamber 14 adjacent to cavity 12, permitting temperature sensor 42 (e.g., an optical pyrometer) to be used to view a process inside cavity 12. In one embodiment, the optical pyrometer has a voltage output that can vary with temperature to within a certain tracking range.

Sensor 42 can develop output signals as a function of the temperature or any other monitorable condition associated with a work piece (not shown) within cavity 12 and provide the signals to controller 44. Dual temperature sensing and heating, as well as automated cooling rate and gas flow controls can also be used. Controller 44 in turn can be used to control operation of power supply 28, which can have one output connected to radiation source 26 as described above and another output connected to valve 22 to control gas flow into radiation cavity 12.

The invention has been practiced with equal success employing microwave sources at both 915 MHz and 2.45 GHz provided by Communications and Power Industries (CPI), although radiation having any frequency less than about 333 GHz can be used. The 2.45 GHz system provided continuously variable microwave power from about 0.5 kilowatts to about 5.0 kilowatts. A 3-stub tuner allowed impedance matching for maximum power transfer and a dual directional coupler (not shown in FIG. 1) was used to measure forward and reflected powers.

As mentioned above, radiation having any frequency less than about 333 GHz can be used consistent with this invention. For example, frequencies, such as power line frequencies (about 50 Hz to about 60 Hz), can be used, although the pressure of the gas from which the plasma is formed may be lowered to assist with plasma ignition. Also, any radio frequency or microwave frequency can be used consistent with this invention, including frequencies greater than about 100 kHz. In most cases, the gas pressure for such relatively high frequencies need not be lowered to ignite, modulate, or sustain a plasma, thereby enabling many plasma-processes to occur at atmospheric pressures and above. The equipment was computer controlled using LabView 6i software, which provided real-time temperature monitoring and microwave power control. Noise was reduced by using sliding averages of suitable number of data points. Also, to improve speed and computational efficiency, the number of stored data points in the buffer array were limited by using shift-registers and buffer-sizing.

The pyrometer measured the temperature of a sensitive area of about 1 cm$^2$, which was used to calculate an average temperature. The pyrometer sensed radiant intensities at two wavelengths and fit those intensities using Planck's law to determine the temperature. It will be appreciated, however, that other devices and methods for monitoring and controlling temperature are also available and can be used consistent with this invention. Control software that can be used consistent with this invention is described, for example, in commonly owned, concurrently filed PCT Application US03/14135, which is hereby incorporated by reference in its entirety.

Chamber 14 had several glass-covered viewing ports with microwave shields and one quartz window for pyrometer access. Several ports for connection to a vacuum pump and a gas source were also provided, although not necessarily used.

System 10 also included an optional closed-loop deionized water cooling system (not shown) with an external heat exchanger cooled by tap water. During operation, the deionized water first cooled the magnetron, then the load-dump in the circulator (used to protect the magnetron), and finally the radiation chamber through water channels welded on the outer surface of the chamber.

Plasma Catalysts

A plasma catalyst consistent with this invention can include one or more different materials and may be either passive or active. A plasma catalyst can be used, among other things, to ignite, modulate, and/or sustain a plasma at a gas pressure that is less than, equal to, or greater than atmospheric pressure.

One method of forming a plasma consistent with this invention can include subjecting a gas in a cavity to electromagnetic radiation having a frequency of less than about 333 GHz in the presence of a passive plasma catalyst. A passive plasma catalyst consistent with this invention can include any object capable inducing a plasma by deforming a local electric field (e.g., an electromagnetic field) consistent with this invention, without necessarily adding additional energy through the catalyst, such as by applying an electric voltage to create a spark.

A passive plasma catalyst consistent with this invention can be, for example, a nano-particle or a nano-tube. As used herein, the term "nano-particle" can include any particle having a maximum physical dimension less than about 100 nm that is at least electrically semi-conductive. Also, both single-walled and multi-walled carbon nanotubes, doped and undoped, can be particularly effective for igniting plasmas consistent with this invention because of their exceptional electrical conductivity and elongated shape. The nanotubes can have any convenient length and can be a powder fixed to a substrate. If fixed, the nanotubes can be oriented randomly on the surface of the substrate or fixed to the substrate (e.g., at some predetermined orientation) while the plasma is ignited or sustained.

A passive plasma catalyst consistent with this invention can also be, for example, a powder and need not comprise nano-particles or nano-tubes. It can be formed, for example, from fibers, dust particles, flakes, sheets, etc. When in powder form, the catalyst can be suspended, at least temporarily, in a gas. By suspending the powder in the gas, the powder can be quickly dispersed throughout the cavity and more easily and uniformly consumed, if desired.

Figure 1A:
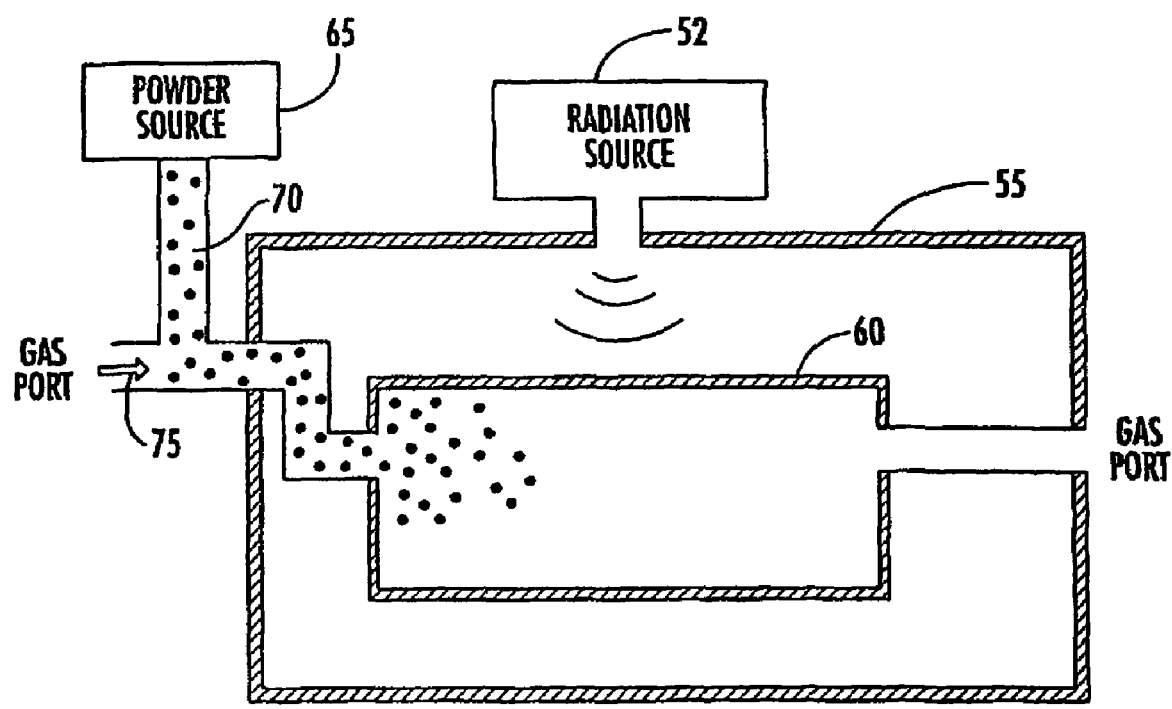
FIG. 1A shows an illustrative embodiment of a portion of a nitrogen plasma system for adding a powder plasma catalyst to a plasma cavity for igniting, modulating, or sustaining a plasma in a cavity consistent with this invention.

In one embodiment, the powder catalyst can be carried into the carburizing cavity and at least temporarily suspended with a carrier gas. The carrier gas can be the same or different from the gas that forms the plasma. Also, the powder can be added to the gas prior to being introduced to the cavity. For example, as shown in FIG. 1A, radiation source 52 can supply radiation to cavity 55, which includes plasma cavity 60 (e.g., where a nitrogen surface-treatment may take place). Powder source 65 can provide catalytic powder 70 into gas stream 75. In an alternative embodiment, powder 70 can be first added to cavity 60 in bulk (e.g., in a pile) and then distributed in the cavity in any number of ways, including flowing a gas through or over the bulk powder. In addition, the powder can be added to the gas for igniting, modulating, or sustaining a plasma by moving, conveying, drizzling, sprinkling, blowing, or otherwise feeding the powder into or within the cavity.

In one experiment, a plasma was ignited in a cavity by placing a pile of carbon fiber powder in a copper pipe that extended into the cavity. Although sufficient radiation was directed into the cavity, the copper pipe shielded the powder from the radiation and no plasma ignition took place. However, once a carrier gas began flowing through the pipe, forcing the powder out of the pipe and into the cavity, and thereby subjecting the powder to the radiation, a plasma was nearly instantaneously ignited in the cavity at about atmospheric pressure.

A powder plasma catalyst consistent with this invention can be substantially non-combustible, thus it need not contain oxygen or burn in the presence of oxygen. Thus, as mentioned above, the catalyst can include a metal, carbon, a carbon-based alloy, a carbon-based composite, an electrically conductive polymer, a conductive silicone elastomer, a polymer nanocomposite, an organic-inorganic composite, and any combination thereof.

Also, powder catalysts can be substantially uniformly distributed in the plasma cavity (e.g., when suspended in a gas), and plasma ignition can be precisely controlled within the cavity. Uniform ignition can be important in certain applications, including those applications requiring brief plasma exposures, such as in the form of one or more bursts. Still, a certain amount of time can be required for a powder catalyst to distribute itself throughout a cavity, especially in complicated, multi-chamber cavities. Therefore, consistent with another aspect of this invention, a powder catalyst can be introduced into the cavity through a plurality of ignition ports to more rapidly obtain a more uniform catalyst distribution therein (see below).

In addition to powder, a passive plasma catalyst consistent with this invention can include, for example, one or more microscopic or macroscopic fibers, sheets, needles, threads, strands, filaments, yarns, twines, shavings, slivers, chips, woven fabrics, tape, whiskers, or any combination thereof. In these cases, the plasma catalyst can have at least one portion with one physical dimension substantially larger than another physical dimension. For example, the ratio between at least two orthogonal dimensions can be at least about 1:2, but can be greater than about 1:5, or even greater than about 1:10.

Thus, a passive plasma catalyst can include at least one portion of material that is relatively thin compared to its length. A bundle of catalysts (e.g., fibers) may also be used and can include, for example, a section of graphite tape. In one experiment, a section of tape having approximately thirty thousand strands of graphite fiber, each about 2-3 microns in diameter, was successfully used. The number of fibers in and the length of a bundle are not critical to igniting, modulating, or sustaining the plasma. For example, satisfactory results have been obtained using a section of graphite tape about one-quarter inch long. One type of carbon fiber that has been successfully used consistent with this invention is sold under the trademark Magnamite®, Model No. AS4C-GP3K, by the Hexcel Corporation, of Anderson, S.C. Also, silicon-carbide fibers have been successfully used.

A passive plasma catalyst consistent with another aspect of this invention can include one or more portions that are, for example, substantially spherical, annular, pyramidal, cubic, planar, cylindrical, rectangular or elongated.

The passive plasma catalysts discussed above include at least one material that is at least electrically semi-conductive. In one embodiment, the material can be highly conductive. For example, a passive plasma catalyst consistent with this invention can include a metal, an inorganic material, carbon, a carbon-based alloy, a carbon-based composite, an electrically conductive polymer, a conductive silicone elastomer, a polymer nanocomposite, an organic-inorganic composite, or any combination thereof. Some of the possible inorganic materials that can be included in the plasma catalyst include carbon, silicon carbide, molybdenum, platinum, tantalum, tungsten, and aluminum, although other electrically conductive inorganic materials are believed to work just as well.

In addition to one or more electrically conductive materials, a passive plasma catalyst consistent with this invention can include one or more additives (which need not be electrically conductive). As used herein, the additive can include any material that a user wishes to add to the plasma. For example, in doping semiconductors and other materials, one or more dopants can be added to the plasma through the catalyst. See, e.g., commonly owned, concurrently filed U.S. patent application Ser. No. 10/513,397, which is hereby incorporated by reference in its entirety. The catalyst can include the dopant itself, or it can include a precursor material that, upon decomposition, can form the dopant. Thus, the plasma catalyst can include one or more additives and one or more electrically conductive materials in any desirable ratio, depending on the ultimate desired composition of the plasma and the process using the plasma.

The ratio of the electrically conductive components to the additives in a passive plasma catalyst can vary over time while being consumed. For example, during ignition, the plasma catalyst could desirably include a relatively large percentage of electrically conductive components to improve the ignition conditions. On the other hand, if used while sustaining the plasma, the catalyst could include a relatively large percentage of additives. It will be appreciated by those of ordinary skill in the art that the component ratio of the plasma catalyst used to ignite and sustain the plasma could be the same.

A predetermined ratio profile can be used to simplify many plasma processes, such as nitriding, carbonitriding, and nitrocarburizing. In some conventional plasma processes, the components within the plasma are added as necessary, but such addition normally requires programmable equipment to add the components according to a predetermined schedule. However, consistent with this invention, the ratio of components in the catalyst can be varied, and thus the ratio of components in the plasma itself can be automatically varied. That is, the ratio of components in the plasma at any particular time can depend on which of the catalyst portions is currently being consumed by the plasma. Thus, the catalyst component ratio can be different at different locations within the catalyst. And, the ratio of components in a plasma can depend on the portions of the catalyst currently and/or previously consumed, especially when the flow rate of a gas passing through the plasma chamber is relatively slow.

Figure 2:
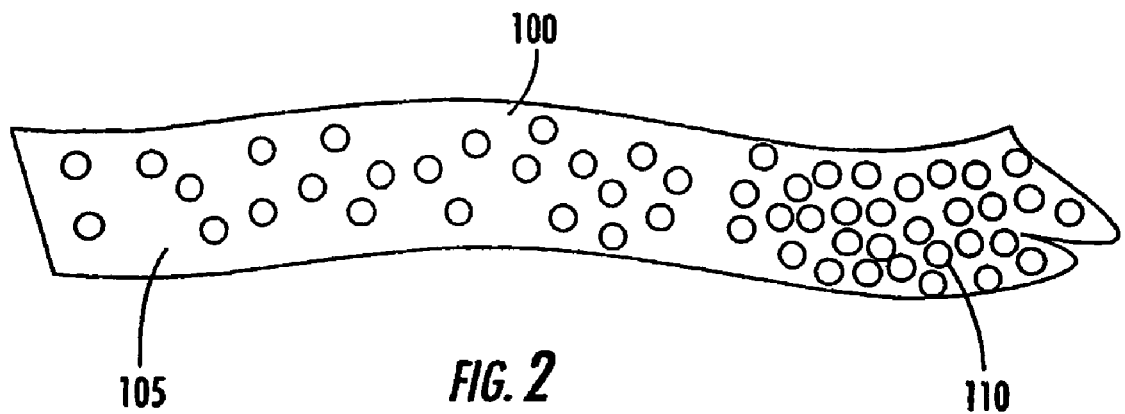
FIG. 2 shows an illustrative plasma catalyst fiber with at least one component having a concentration gradient along its length consistent with this invention.

A passive plasma catalyst consistent with this invention can be homogeneous, inhomogeneous, or graded. Also, the plasma catalyst component ratio can vary continuously or discontinuously throughout the catalyst. For example, in FIG. 2, the component ratio can vary smoothly forming a ratio gradient along the length of catalyst 100. Thus, catalyst 100 can include a strand of material that includes a relatively low concentration of one or more components at section 105 and a continuously increasing concentration toward section 110.

Figure 3:
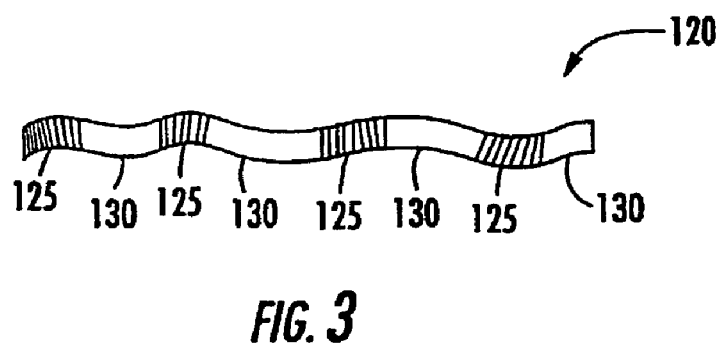
FIG. 3 shows an illustrative plasma catalyst fiber with multiple components at a ratio that varies along its length consistent with this invention.

Alternatively, as shown in FIG. 3, the ratio can vary discontinuously in each portion of catalyst 120, which includes, for example, alternating sections 125 and 130 having different concentrations. It will be appreciated that catalyst 120 can have more than two section types. Thus, the catalytic component ratio being consumed by the plasma can vary in any predetermined fashion. In one embodiment, when the plasma is monitored and a particular additive is detected, further processing can be automatically commenced or terminated.

Another way to vary the ratio of components in a sustained plasma is by introducing multiple catalysts having different component ratios at different times or different rates. For example, multiple catalysts can be introduced at approximately the same location or at different locations within the cavity. When introduced at different locations, the plasma formed in the cavity can have a component concentration gradient determined by the locations of the various catalysts. Thus, an automated system can include a device by which a consumable plasma catalyst is mechanically inserted before and/or during plasma igniting, modulating, and/or sustaining a plasma.

Figure 4:
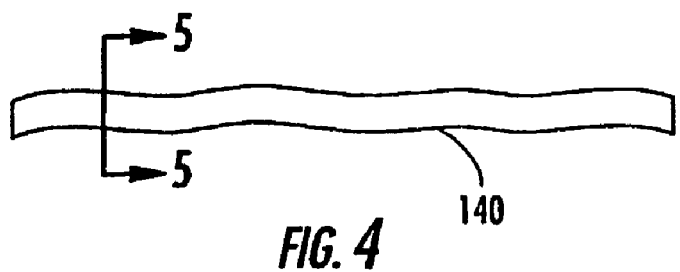
FIG. 4 shows another illustrative plasma catalyst fiber that includes a core under layer and a coating consistent with this invention.
Figure 5:
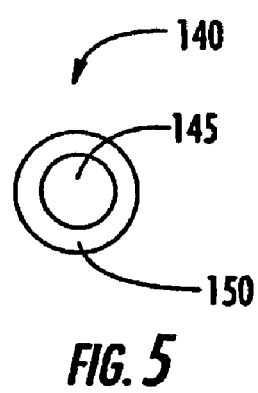
FIG. 5 shows a cross-sectional view of the plasma catalyst fiber of FIG. 4, taken from line 5-5 of FIG. 4, consistent with this invention.

A passive plasma catalyst consistent with this invention can also be coated. In one embodiment, a catalyst can include a substantially non-electrically conductive coating deposited on the surface of a substantially electrically conductive material. Alternatively, the catalyst can include a substantially electrically conductive coating deposited on the surface of a substantially electrically non-conductive material. FIGS. 4 and 5, for example, show fiber 140, which includes under layer 145 and coating 150. In one embodiment, a plasma catalyst including a carbon core is coated with nickel to prevent oxidation of the carbon.

A single plasma catalyst can also include multiple coatings. If the coatings are consumed during contact with the plasma, the coatings could be introduced into the plasma sequentially, from the outer coating to the innermost coating, thereby creating a time-release mechanism. Thus, a coated plasma catalyst can include any number of materials, as long as a portion of the catalyst is at least electrically semi-conductive.

Consistent with another embodiment of this invention, a plasma catalyst can be located entirely within a radiation cavity to substantially reduce or prevent radiation energy leakage via the catalyst. In this way, the plasma catalyst does not electrically or magnetically couple with the vessel containing the cavity or to any electrically conductive object outside the cavity. This prevents sparking at the ignition port and prevents radiation from leaking outside the cavity during the ignition and possibly later if the plasma is sustained. In one embodiment, the catalyst can be located at a tip of a substantially electrically non-conductive extender that extends through an ignition port.

Figure 6:
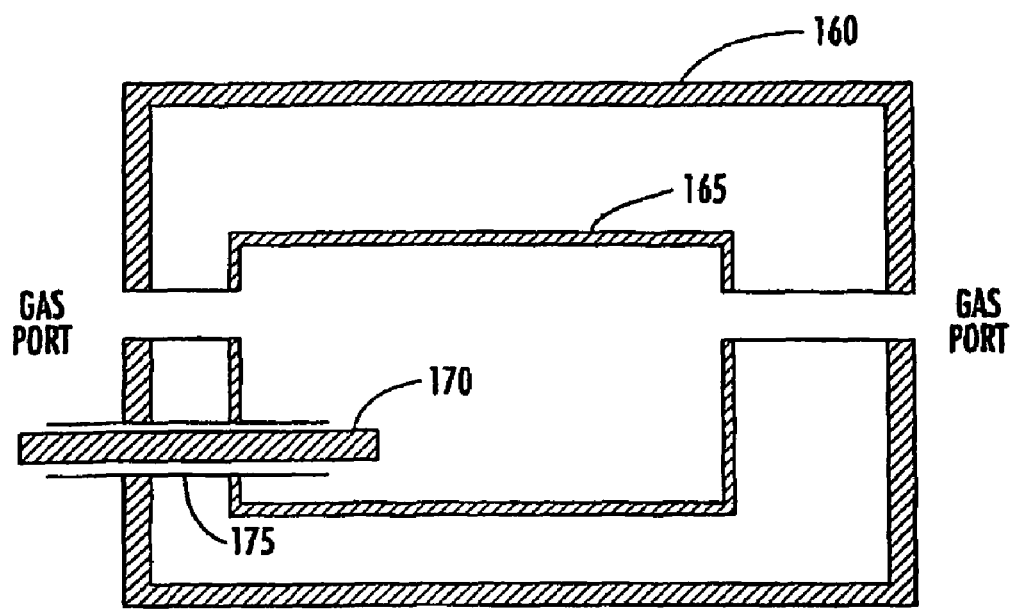
FIG. 6 shows an illustrative embodiment of another portion of a plasma system including an elongated plasma catalyst that extends through ignition port consistent with this invention.
Figure 7:
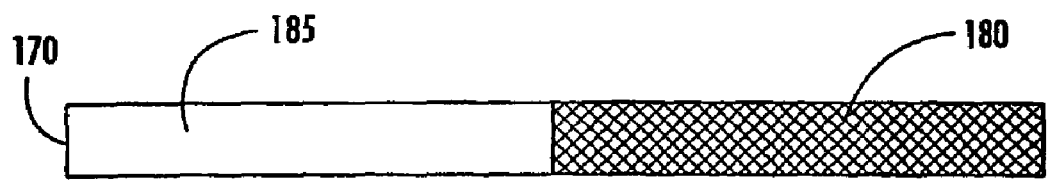
FIG. 7 shows an illustrative embodiment of an elongated plasma catalyst that can be used in the system of FIG. 6 consistent with this invention.

FIG. 6, for example, shows radiation chamber 160 in which plasma cavity 165 is placed. Plasma catalyst 170 can be elongated and can extend through ignition port 175. As shown in FIG. 7, and consistent with this invention, catalyst 170 can include electrically conductive distal portion 180 (which is placed in chamber 160) and electrically non-conductive portion 185 (which is placed substantially outside chamber 160 but can extend into chamber 160). This configuration prevents an electrical connection (e.g., sparking) between distal portion 180 and chamber 160.

Figure 8:
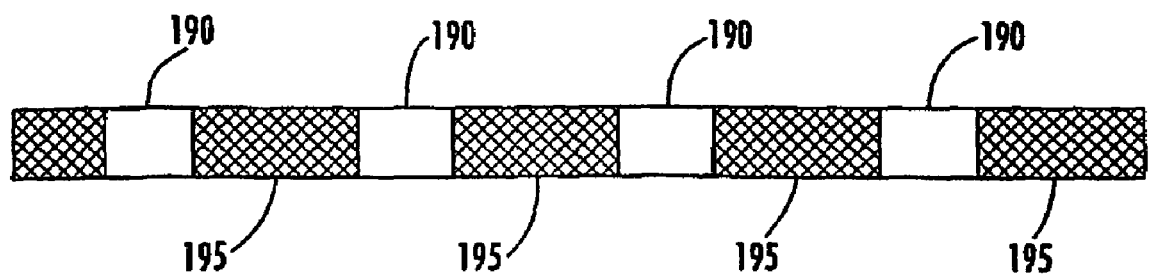
FIG. 8 shows another illustrative embodiment of an elongated plasma catalyst that can be used in the system of FIG. 6 consistent with this invention.

In another embodiment, shown in FIG. 8, the catalyst can be formed from a plurality of electrically conductive segments 190 separated by and mechanically connected to a plurality of electrically non-conductive segments 195. In this embodiment, the catalyst can extend through the ignition port between a point inside the cavity and another point outside the cavity, but the electrically discontinuous profile significantly prevents sparking and energy leakage.

As an alternative to the passive plasma catalysts described above, active plasma catalysts can be used consistent with this invention. A method of forming a nitrogen surface-treatment plasma using an active catalyst consistent with this invention includes subjecting a gas in a cavity to electromagnetic radiation having a frequency less than about 333 GHz in the presence of the active plasma catalyst, which generates or includes at least one ionizing particle or ionizing radiation. It will be appreciated that both passive and active plasma catalysts can be used in the same surface-treatment process.

An active plasma catalyst consistent with this invention can be any particle or high energy wave packet capable of transferring a sufficient amount of energy to a gaseous atom or molecule to remove at least one electron from the gaseous atom or molecule in the presence of electromagnetic radiation. Depending on the source, the ionizing radiation and/or particles can be directed into the cavity in the form of a focused or collimated beam, or they may be sprayed, spewed, sputtered, or otherwise introduced.

Figure 9:
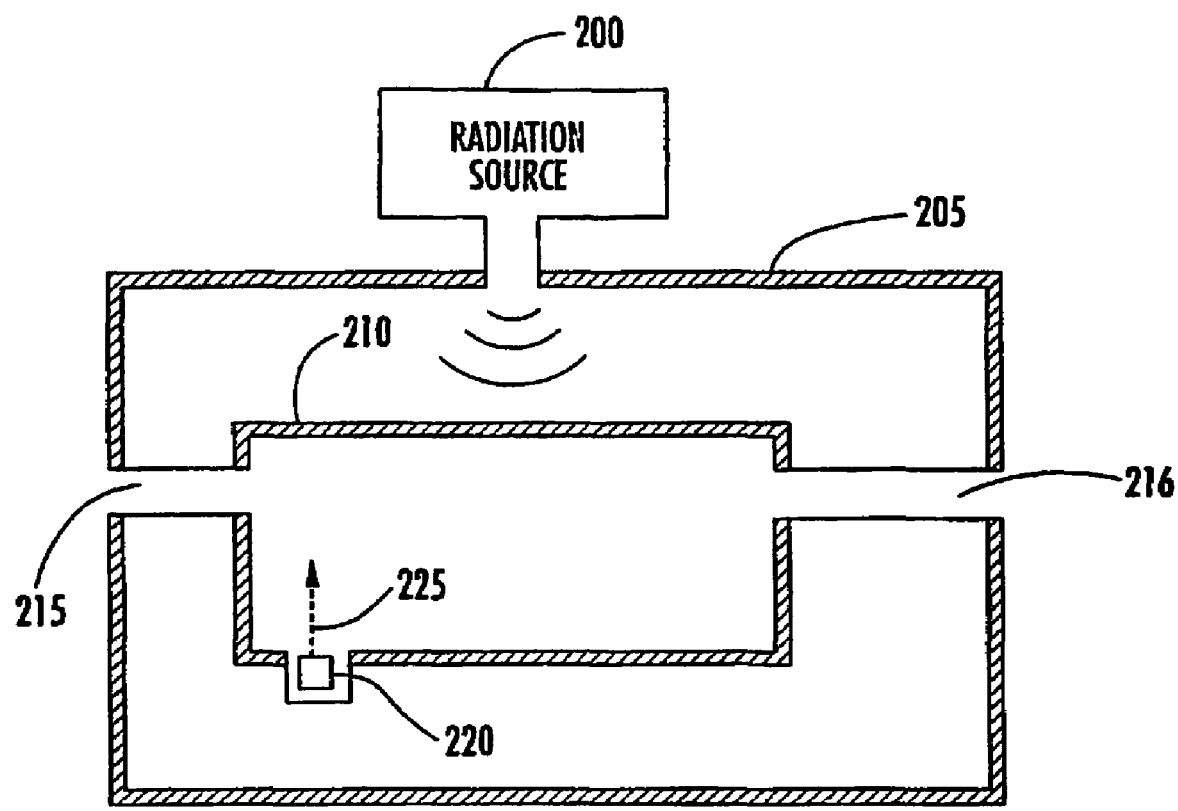
FIG. 9 shows an illustrative embodiment of a portion of a plasma system for directing radiation into a plasma chamber consistent with this invention.

For example, FIG. 9 shows radiation source 200 directing radiation into chamber 205. Plasma cavity 210 is positioned inside of chamber 205 and may permit a gas to flow there through via ports 215 and 216. Source 220 directs ionizing particles and/or radiation 225 into cavity 210. Source 220 can be protected, for example, by a metallic screen that allows the ionizing particles to pass through but shields source 220 from radiation. If necessary, source 220 can be water-cooled.

Examples of ionizing radiation and/or particles consistent with this invention can include x-rays, gamma radiation, alpha particles, beta particles, neutrons, protons, and any combination thereof. Thus, an ionizing particle catalyst can be charged (e.g., an ion from an ion source) or uncharged and can be the product of a radioactive fission process. In one embodiment, the vessel in which the plasma cavity is formed could be entirely or partially transmissive to the ionizing particle catalyst. Thus, when a radioactive fission source is located outside the cavity, the source can direct the fission products through the vessel to ignite the plasma. The radioactive fission source can be located inside the radiation chamber to substantially prevent the fission products (i.e., the ionizing particle catalyst) from creating a safety hazard.

In another embodiment, the ionizing particle can be a free electron, but it need not be emitted in a radioactive decay process. For example, the electron can be introduced into the cavity by energizing an electron source (such as a metal), such that the electrons have sufficient energy to escape from the source. The electron source can be located inside the cavity, adjacent the cavity, or even in the cavity wall. It will be appreciated by those of ordinary skill in the art that the any combination of electron sources is possible. A common way to produce electrons is to heat a metal, and these electrons can be further accelerated by applying an electric field.

In addition to electrons, free energetic protons can also be used to catalyze a plasma. In one embodiment, a free proton can be generated by ionizing hydrogen and, optionally, accelerated with an electric field.

Multi-Mode Radiation Cavities

A radiation waveguide, cavity, or chamber can be designed to support or facilitate propagation of at least one electromagnetic radiation mode. As used herein, the term "mode" refers to a particular pattern of any standing or propagating electromagnetic wave that satisfies Maxwell's equations and the applicable boundary conditions (e.g., of the cavity). In a waveguide or cavity, the mode can be any one of the various possible patterns of propagating or standing electromagnetic fields. Each mode is characterized by its frequency and polarization of the electric field and/or the magnetic field vectors. The electromagnetic field pattern of a mode depends on the frequency, refractive indices or dielectric constants, and waveguide or cavity geometry.

A transverse electric (TE) mode is one whose electric field vector is normal to the direction of propagation. Similarly, a transverse magnetic (TM) mode is one whose magnetic field vector is normal to the direction of propagation. A transverse electric and magnetic (TEM) mode is one whose electric and magnetic field vectors are both normal to the direction of propagation. A hollow metallic waveguide does not typically support a normal TEM mode of radiation propagation. Even though radiation appears to travel along the length of a waveguide, it may do so only by reflecting off the inner walls of the waveguide at some angle. Hence, depending upon the propagation mode, the radiation (e.g., microwave radiation) may have either some electric field component or some magnetic field component along the axis of the waveguide (often referred to as the z-axis).

The actual field distribution inside a cavity or waveguide is a superposition of the modes therein. Each of the modes can be identified with one or more subscripts (e.g., $TE_{10}$ ("tee ee one zero")). The subscripts normally specify how many "half waves" at the guide wavelength are contained in the x and y directions. It will be appreciated by those skilled in the art that the guide wavelength can be different from the free space wavelength because radiation propagates inside the waveguide by reflecting at some angle from the inner walls of the waveguide. In some cases, a third subscript can be added to define the number of half waves in the standing wave pattern along the z-axis.

For a given radiation frequency, the size of the waveguide can be selected to be small enough so that it can support a single propagation mode. In such a case, the system is called a single-mode system (i.e., a single-mode applicator). The $TE_{10}$ mode is usually dominant in a rectangular single-mode waveguide.

As the size of the waveguide (or the cavity to which the waveguide is connected) increases, the waveguide or applicator can sometimes support additional higher order modes forming a multi-mode system. When many modes are capable of being supported simultaneously, the system is often referred to as highly moded.

A simple, single-mode system has a field distribution that includes at least one maximum and/or minimum. The magnitude of a maximum largely depends on the amount of radiation supplied to the system. Thus, the field distribution of a single mode system is strongly varying and substantially non-uniform.

Unlike a single-mode cavity, a multi-mode cavity can support several propagation modes simultaneously, which, when superimposed, results in a complex field distribution pattern. In such a pattern, the fields tend to spatially smear and, thus, the field distribution usually does not show the same types of strong minima and maxima field values within the cavity. In addition, as explained more fully below, a mode-mixer can be used to "stir" or "redistribute" modes (e.g., by mechanical movement of a radiation reflector). This redistribution desirably provides a more uniform time-averaged field distribution within the cavity.

A multi-mode processing cavity consistent with this invention can support at least two modes, and may support many more than two modes. Each mode has a maximum electric field vector. Although there may be two or more modes, one mode may be dominant and may have a maximum electric field vector magnitude that is larger than the other modes. As used herein, a multi-mode cavity may be any cavity in which the ratio between the first and second mode magnitudes is less than about 1:10, or less than about 1:5, or even less than about 1:2. It will be appreciated by those of ordinary skill in the art that the smaller the ratio, the more distributed the electric field energy between the modes, and hence the more distributed the radiation energy is in the cavity.

The distribution of plasma within a processing cavity may strongly depend on the distribution of the applied radiation. For example, in a pure single mode system, there may only be a single location at which the electric field is a maximum. Therefore, a strong plasma may only form at that single location. In many applications, such a strongly localized plasma could undesirably lead to non-uniform plasma treatment or heating (i.e., localized overheating and underheating).

Whether or not a single or multi-mode processing cavity is used consistent with this invention, it will be appreciated by those of ordinary skill in the art that the cavity in which the plasma is formed can be completely closed or partially open. For example, in certain applications, such as in plasma-assisted furnaces, the cavity could be entirely closed. See, for example, commonly owned, concurrently filed, PCT Application US03/14133, which is fully incorporated herein by reference. In other applications, however, it may be desirable to flow a gas through the cavity, and therefore the cavity must be open to some degree. In this way, the flow, type, and pressure of the flowing gas can be varied over time. This may be desirable because certain gases that facilitate formation of plasma, such as argon, for example, are easier to ignite but may not be needed during subsequent plasma processing.

Mode-Mixing

For many nitrogen surface-treatment applications, a cavity containing a substantially uniform plasma is desirable. However, because microwave radiation can have a relatively long wavelength (e.g., several tens of centimeters), obtaining a uniform distribution can be difficult to achieve. As a result, consistent with one aspect of this invention, the radiation modes in a multi-mode cavity can be mixed, or redistributed, over a period of time. Because the field distribution within the cavity must satisfy all of the boundary conditions set by the inner surface of the cavity, those field distributions can be changed by changing the position of any portion of that inner surface.

In one embodiment consistent with this invention, a movable reflective surface can be located inside the nitrogen treatment cavity. The shape and motion of the reflective surface can change the reflective properties of the inner surface of the cavity, as a whole, during motion. For example, an "L" shaped metallic object (i.e., "mode-mixer") when rotated about any axis will change the location or the orientation of the reflective surfaces in the cavity and therefore change the radiation distribution therein. Any other asymmetrically shaped object can also be used (when rotated), but symmetrically shaped objects can also work, as long as the relative motion (e.g., rotation, translation, or a combination of both) causes some change in the location or orientation of the reflective surfaces. In one embodiment, a mode-mixer can be a cylinder that is rotatable about an axis that is not the cylinder's longitudinal axis.

Each mode of a multi-mode nitrogen surface-treatment cavity may have at least one maximum electric field vector, but each of these vectors could occur periodically across the inner dimension of the cavity. Normally, these maxima are fixed, assuming that the frequency of the radiation does not change. However, by moving a mode-mixer such that it interacts with the radiation, it is possible to move the positions of the maxima. For example, mode-mixer 38 can be used to optimize the field distribution within nitrogen surface-treatment cavity 14 such that the plasma ignition conditions and/or the plasma sustaining conditions are optimized. Thus, once a plasma is excited, the position of the mode-mixer can be changed to move the position of the maxima for a uniform time-averaged plasma process (e.g., heating and/or nitrogen surface treating).

Thus, consistent with this invention, mode-mixing can be useful during plasma ignition. For example, when an electrically conductive fiber is used as a plasma catalyst, it is known that the fiber's orientation can strongly affect the minimum plasma-ignition conditions. It has been reported, for example, that when such a fiber is oriented at an angle that is greater than 60° to the electric field, the catalyst does little to improve, or relax, these conditions. By moving a reflective surface either in or near the nitrogen surface-treatment cavity, however, the electric field distribution can be significantly changed.

Mode-mixing can also be achieved by launching the radiation into the applicator chamber through, for example, a rotating waveguide joint that can be mounted inside the applicator chamber. The rotary joint can be mechanically moved (e.g., rotated) to effectively launch the radiation in different directions in the radiation chamber. As a result, a changing field pattern can be generated inside the applicator chamber.

Mode-mixing can also be achieved by launching radiation in the radiation chamber through a flexible waveguide. In one embodiment, the waveguide can be mounted inside the chamber. In another embodiment, the waveguide can extend into the chamber. The position of the end portion of the flexible waveguide can be continually or periodically moved (e.g., bent) in any suitable manner to launch the radiation (e.g., microwave radiation) into the chamber at different directions and/or locations. This movement can also result in mode-mixing and facilitate more uniform plasma processing (e.g., heating) on a time-averaged basis. Alternatively, this movement can be used to optimize the location of a plasma for ignition or other plasma-assisted process.

If the flexible waveguide is rectangular, a simple twisting of the open end of the waveguide will rotate the orientation of the electric and the magnetic field vectors in the radiation inside the applicator chamber. Then, a periodic twisting of the waveguide can result in mode-mixing as well as rotating the electric field, which can be used to assist ignition, modulation, or sustaining of a plasma.

Thus, even if the initial orientation of the catalyst is perpendicular to the electric field, the redirection of the electric field vectors can change the ineffective orientation to a more effective one. Those skilled in the art will appreciate that mode-mixing can be continuous, periodic, or preprogrammed.

In addition to plasma ignition, mode-mixing can be useful during subsequent nitrogen surface-treatment processes and other types of plasma processing to reduce or create (e.g., tune) "hot spots" in the chamber. When a microwave cavity only supports a small number of modes (e.g., less than 5), one or more localized electric field maxima can lead to "hot spots" (e.g., within cavity 12). In one embodiment, these hot spots could be configured to coincide with one or more separate, but simultaneous, plasma ignitions or nitrogen surface-treatment events. Thus, the plasma catalyst can be located at one or more of those ignition or subsequent nitrogen surface-treatment (e.g., plasma processing) positions.

Multi-Location Ignition

A nitrogen surface-treatment plasma can be ignited using multiple plasma catalysts at different locations. In one embodiment, multiple fibers can be used to ignite the plasma at different points within the cavity. Such multi-point ignition can be especially beneficial when a uniform plasma ignition is desired. For example, when a plasma is modulated at a high frequency (i.e., tens of Hertz and higher), or ignited in a relatively large volume, or both, substantially uniform instantaneous striking and restriking of the plasma can be improved. Alternatively, when plasma catalysts are used at multiple points, they can be used to sequentially ignite a nitrogen surface-treatment plasma at different locations within a plasma chamber by selectively introducing the catalyst at those different locations. In this way, a nitrogen surface-treatment plasma ignition gradient can be controllably formed within the cavity, if desired.

Also, in a multi-mode nitrogen surface-treatment cavity, random distribution of the catalyst throughout multiple locations in the cavity can increase the likelihood that at least one of the fibers, or any other passive plasma catalyst consistent with this invention, is optimally oriented with the electric field lines. Still, even where the catalyst is not optimally oriented (not substantially aligned with the electric field lines), the ignition conditions are improved.

Furthermore, because a catalytic powder can be suspended in a gas, it is believed that each powder particle may have the effect of being placed at a different physical location within the cavity, thereby improving ignition uniformity within the nitrogen surface-treatment cavity.

Dual-Cavity Plasma Iqniting/Sustaining

A dual-cavity arrangement can be used to ignite and sustain a plasma consistent with this invention. In one embodiment, a system includes at least a first ignition cavity and a second nitrogen surface-treatment cavity in fluid communication with the first cavity. To ignite a plasma, a gas in the first ignition cavity can be subjected to electromagnetic radiation having a frequency less than about 333 GHz, optionally in the presence of a plasma catalyst. In this way, the proximity of the first and second cavities may permit a plasma formed in the ignition cavity to ignite a nitrogen surface-treatment plasma in the second nitrogen surface-treatment cavity, which may be modulated or sustained with additional electromagnetic radiation.

In one embodiment of this invention, the first cavity can be very small and designed primarily, or solely, for plasma ignition. In this way, very little microwave energy may be required to ignite the plasma, permitting easier ignition, especially when a plasma catalyst is used consistent with this invention.

In one embodiment, the first cavity may be a substantially single mode cavity and the second nitrogen surface-treatment cavity may be a multi-mode cavity. When the first ignition cavity only supports a single mode, the electric field distribution may strongly vary within the cavity, forming one or more precisely located electric field maxima. Such maxima are normally the first locations at which plasmas ignite, making them ideal points for placing plasma catalysts. It will be appreciated, however, that when a plasma catalyst is used, it need not be placed in the electric field maximum and, many cases, need not be oriented in any particular direction.

Illustrative Nitrogen Surface-Treatment Processes

Consistent with the invention, there may be provided one or more methods of plasma-assisted nitrogen surface-treatment. These methods may include, for example, plasma nitriding, plasma carbo-nitriding, and plasma nitro-carburizing, and any other surface-treatment method where at least some nitrogen is absorbed or diffused into an object. As used herein, plasma-assisted nitrogen surface-treatment systems and methods are not limited only to the use of nitrogen as the surface treating agent. Rather, the plasma-assisted nitrogen surface-treatment systems and methods consistent with the invention may include, in addition to nitrogen, carbon, boron, and any other element that may be introduced into a plasma and absorbed or diffused into or onto the surface of an object.

In a plasma-assisted nitriding process consistent with the invention, nitrogen atoms from a source of nitrogen are supplied to a plasma. The plasma may heat at least a portion of an object, and the nitrogen atoms in the plasma can diffuse into the object and increase an average nitrogen concentration of the object. The nitrogen may be diffused either uniformly over the entire surface of an object, or the nitrogen may be diffused into only one or more surface regions of the object.

In a plasma-assisted carbonitriding process consistent with the invention, both nitrogen and carbon atoms are supplied to the plasma. In this process, at least a portion of the object to be treated may be heated by the plasma to a temperature at or above a transformation temperature for at least one material component of the object. As used herein, a transformation temperature is a temperature at which a change in phase (e.g., when austenite begins to form) occurs. For example, for certain ferrous alloys, this transformation temperature can be about 750 degrees Celsius. During carbonitriding, for example, nitrogen and carbon can diffuse from the plasma into the object and the diffusion of nitrogen and carbon may occur substantially simultaneously.

In a plasma-assisted nitrocarburizing process consistent with the invention, both nitrogen and carbon atoms are supplied to the plasma. In this process, at least a portion of the object to be treated may be heated by the plasma to within a range of temperatures below a transformation temperature for one or more of the material components of the object. For example, this range of temperatures can be between about 400 degrees Celsius to about 750 degrees Celsius for certain ferrous alloys, or, more specifically, between about 400 degrees Celsius to about 650 degrees Celsius.

In an illustrative embodiment of the invention, a plasma may be initiated, as described above, by subjecting a gas (supplied by gas source 24, for example) to radiation (e.g., microwave radiation) in the presence of a plasma catalyst. As shown in FIG. 1, this plasma initiation may occur within cavity 12, which may be formed in a vessel positioned inside microwave chamber (i.e., applicator) 14. Nitrogen may be supplied to the initiated plasma by, for example, providing any source of nitrogen to the plasma. In one embodiment, this source may be the plasma catalyst itself. That is, the plasma catalyst may include nitrogen that is consumed by the plasma through contact with the plasma.

Further, a plasma catalyst useful in one particular embodiment of the invention may include two or more different materials according to a predetermined ratio profile selected for a particular nitrogen surface-treatment process. For example, in one embodiment, a first material may be well suited for facilitating plasma ignition, and a second material may serve as a primary source of nitrogen. The plasma catalyst may also include additional materials that enable various other nitrogen surface-treatments. For example, the plasma catalyst may include a source of carbon, which, when consumed by the plasma, provides carbon to the plasma for use in nitrocarburizing and/or carbonitriding processes. These materials may be included in the plasma catalyst in configurations including those configurations shown in FIGS. 2-5, 7, 8, and any combination thereof.

Nitrogen may also be provided to the plasma using a nitrogen source other than, or in addition to, the plasma catalyst. Such a nitrogen source can provide nitrogen to the plasma by, for example, contacting the plasma. Examples of sources of nitrogen that may be provided to the plasma include at least one of nitrogen gas, a nitrogen-containing gas or liquid (e.g., ammonia, nitrogen dioxide, nitrogen monoxide, nitrous oxide, or others), nitrogen-containing solids, ammonium nitrite, and any combination thereof. These nitrogen sources may be present in cavity 12 upon initiation of the plasma, or they may be supplied to cavity 12 after the plasma has been initiated. If the nitrogen source is gaseous, gas source 24 may be configured to supply not only the plasma source gas, but also the nitrogen source gas (e.g., gas source 24 may be configured with multiple gas containers and multiple valves 22).

Similarly, the carbon in the nitrocarburizing plasma and/or the carbonitriding plasma may be provided by a carbon source other than or in addition to the plasma catalyst. Such a carbon source can provide carbon to the plasma by, for example, contacting the plasma. Examples of carbon sources that may be provided to the plasma include at least one of a carbon-containing gas, a hydrocarbon gas (e.g., methane, or other), powdered carbon, carbon nanotubes, carbon nanoparticles, carbon fibers, graphite, solid carbon, vaporized carbon (e.g., carbon particles dissociated from a carbon source by methods including, for example, laser ablation), charcoal, coke, amorphous carbon, cast iron, and any combination thereof. These carbon sources may be present in cavity 12 upon initiation of the surface-treating plasma, or they may be supplied to cavity 12 after the plasma has been initiated. If the source of carbon is gaseous, gas source 24 may be configured to supply not only the plasma source gas, but also the carbon source gas (e.g., gas source 24 may be configure with multiple gas containers and multiple valves 22). Thus, it will be appreciated that one or more separate sources, or composite sources, can be used consistent with this invention.

Nitrogen and, optionally carbon, present in the plasma may diffuse into an object during the plasma-assisted surface-treatment consistent with the invention. For example, at least one surface region of the object may be exposed to the plasma for a period of time sufficient to transfer at least some of the nitrogen, and optionally the carbon, from the plasma to the object through the surface region.

Further, exposure of the surface region to the plasma may cause the surface region of the object to absorb additional carbon and nitrogen according to a predetermined rate profile. For example, a plasma consistent with the invention can be made to include one or both of a time-dependent carbon concentration and a time-dependent nitrogen concentration. Through variation of the nitrogen and/or carbon concentrations in the plasma, the rate of absorption and diffusion of nitrogen and/or carbon into the object may be controlled to substantially conform to the predetermined rate profile. Additionally, the nitrogen and/or carbon concentrations in the plasma may be varied to achieve a predetermined depth profile of nitrogen and/or carbon below the surface region of the object exposed to the plasma.

Nitrogen and carbon concentrations in the plasma may be controlled by, for example, introducing nitrogen and carbon into cavity 12 from nitrogen and carbon sources according to a particular time/quantity profile. Additionally, these concentrations may be varied using a plasma catalyst, as described above. For example, the plasma catalyst may include at least nitrogen and carbon in a ratio. By contacting the plasma catalyst with the plasma, the catalyst may be plasmatized such that the nitrogen and carbon in the plasma catalyst are transferred from the catalyst to the plasma at substantially the same ratio.

This ratio may be uniform throughout the plasma catalyst, or it may vary within the plasma catalyst. For example, the plasma catalyst may include a plurality of portions where each of the portions has a respective different nitrogen to carbon ratio. In such an embodiment, the portions of the plasma catalyst may be plasmatized sequentially such that the rate at which both nitrogen and carbon are transferred to the plasma depends on which of the portions is being plasmatized. The plasma catalyst may also include nitrogen and carbon in a ratio that varies according to a ratio gradient along one or more dimensions of the plasma catalyst.

Through exposure to the plasma, heat can be efficiently transferred from the plasma to an object at any desirable rate. For example, the temperature of the object can be programmed to rise at a rate of more than 400 degrees Celsius per minute. Regardless of the rate of change, the surface-treatment can occur at nearly any temperature. Higher temperatures, however, may facilitate diffusion of nitrogen and/or carbon into the object.

In one embodiment consistent with this invention, nitriding may be performed at temperatures of between about 400 degrees Celsius and about 650 degrees Celsius. Similarly, a nitrocarburizing process may be performed at temperatures of between about 400 degrees Celsius and about 650 degrees Celsius. A carbonitriding process consistent with the invention may be performed at temperatures of at least 650 degrees Celsius, and more particularly, at least 750 degrees Celsius. Temperatures above or below these ranges and values are also possible consistent with this invention.

Consistent with one aspect of the invention, nitrogen, and optionally carbon, from the plasma may diffuse into the object to a diffusion depth of between about 0.01 inches and about 0.1 inches, although other diffusion depths are possible. As a result, the nitrogen, and optionally carbon, content in this diffusion region may be increased as desired, for example, in ferrous objects, including numerous types of steel (e.g., AISI 4140, AISI 4340, nitralloy, and others). Non-ferrous materials may also be surface treated consistent with this invention.

While a nitrogen-containing surface-treatment plasma may be initiated without the use of a plasma catalyst, a plasma catalyst may be used to ignite, modulate, or sustain a plasma in certain embodiments. For example, the presence of a passive or active plasma catalyst consistent with this invention may reduce the radiation energy density needed to initiate a surface-treatment plasma. This reduction may allow a plasma to be generated in a controlled manner with a relatively low amount of radiation energy, which can be useful when sensitive portions of an object are exposed to the surface-treatment plasma. In one controlled embodiment, the plasma may be initiated using a time-averaged radiation energy (e.g., microwave energy) density below about 10 W/cm$^3$. Further, the plasma may be initiated using a time-averaged radiation energy density below about 5 W/cm$^3$. Advantageously, these relatively low energy densities can be achieved without vacuum equipment.

Thus, the use of a plasma catalyst may facilitate control over the nitrogen-containing surface-treatment plasma and processes using the plasma. Specifically, because plasma is an efficient absorber of radiation, including microwave radiation, any radiation used to initiate the nitrogen-containing surface-treatment plasma may be mostly and immediately absorbed by the plasma. Therefore, the radiation energy directed into a nitrogen surface-treatment cavity may be less subject to reflection at the early stages of generating the plasma. As a result, the use of a plasma catalyst may increase control over the heating rate of an object exposed to the plasma, the temperature of the object, and the rate of a particular process using the plasma (e.g., nitriding, nitrocarburizing, carbonitriding, or any other plasma-assisted process), as well as decrease the likelihood of strong radiation reflection at the early stage of a nitrogen surface-treatment process.

The use of a plasma catalyst may also enable initiation of a nitrogen-containing surface-treatment plasma over a broad range of pressures including pressures less than, equal to, or greater than atmospheric pressure. For example, a nitrogen-containing surface-treatment plasma consistent with the invention may be generated not only in vacuum environments, where the total pressure is less than atmospheric pressure, but the presence of a plasma catalyst may aid in initiating a plasma at pressures at or above atmospheric pressure. In one embodiment, a nitrogen-containing surface-treatment plasma may be initiated in a cavity from a gaseous environment having an initial pressure level of at least about 760 Torr. Further, the plasma-assisted nitrogen surface-treatment processes consistent with the invention may proceed by exposing an object to a plasma in an environment having a pressure of at least about 760 Torr.

In addition to the plasma-assisted nitrogen surface-treatment of a single surface region, or portion, of an object, the entire surface region of the object may also be treated consistent with this invention. Additionally, one or more separate surface regions on the object may be selectively nitrided, nitro-carburized, or carbo-nitrided. Certain surface regions of the object may be effectively masked from the nitrogen-containing surface-treatment plasma to substantially prevent exposure of these regions to the plasma. In these regions, substantially no direct surface treatment (e.g., diffusion of nitrogen and/or carbon) will occur.

For example, cavity 12 may be configured in such a way as to prevent exposure of certain surface regions of the object to the plasma. As previously discussed, the number or order of modes of the radiation in cavity 12 may depend on the size or configuration of the cavity. The presence of an object to be nitrogen surface treated within cavity 12 may also affect the field distribution in the modes of radiation within the cavity. The boundary conditions for normal incidence of electromagnetic radiation on metallic objects require that the electric field at the surface be zero and the first maxima occur at a distance of a quarter wavelength from the surface of the object. Consequently, if the gap between the surface of the metallic object and the inner wall of the cavity is less than about a quarter wavelength of the radiation, little or no plasma may be sustained in these areas, and the surface regions of the object satisfying this condition may experience little or no nitrogen surface-treatment. These "masked" surface regions may be provided through positioning of the object within cavity 12, by configuring the walls of cavity 12, or by any other suitable method for controlling the distance between the surface of the object and the cavity walls.

A second method for substantially preventing surface treatment at a particular surface region of the object may include orienting the object with respect to cavity 12 such that at least a portion of the object is located within the cavity and another portion of the object is located outside of the cavity. The portion within the cavity may be surface treated, and the portion located outside the cavity may remain substantially free of surface treatment.

It will be appreciated by those of ordinary skill in the art that the plasma-assisted nitrogen surface-treatment methods consistent with this invention need not occur within a cavity at all. Rather, a nitrogen-containing surface-treatment plasma formed in a cavity can be flowed through an aperture and used outside the cavity to surface treat an object. Methods and apparatus for forming plasma jets consistent with this invention is described, for example, in commonly owned, concurrently filed PCT Application US03/14122, which is hereby incorporated by reference in its entirety.

To generate or maintain a substantially uniform time-averaged radiation field distribution within cavity 12, mode mixer 38 may be provided, as shown in FIG. 1. Alternatively, or additionally, the object may be moved with respect to the plasma while being exposed to the plasma. Such motion may provide more uniform exposure of all surface regions of the object to the plasma, which may cause nitrogen, and optionally carbon, to be diffused into the surface of the object according to a substantially uniform profile. Further, such motion may also help to control heating of the object (e.g., to heat certain areas of the object more rapidly than other areas or to heat the entire surface of the part substantially uniformly).

An electric potential bias may be applied to the object during the plasma-assisted nitrogen surface-treatment processes consistent with the invention. Such a potential bias may facilitate heating of the object by attracting the charged carbon atoms in the plasma to the object, which may encourage uniform coverage of the plasma over the object. Further, the potential bias may accelerate the charged nitrogen, and optionally carbon, atoms toward the object, which may also increase the rate of nitrogen/carbon diffusion. The potential bias applied to the object may be, for example, an AC bias, a DC bias, or a pulsed DC bias. The magnitude of the bias may be selected according to a particular application. For example, the magnitude of the voltage may range from 0.1 volts to 100 volts, or even several hundred volts depending on the desired rate of attraction of the ionized species. Further, the bias may be either positive or negative.

In the foregoing described embodiments, various features are grouped together in a single embodiment for purposes of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description of Embodiments, with each claim standing on its own as a separate preferred embodiment of the invention.

We claim:

1. A method of nitriding a first surface region of an object, the method comprising:
   initiating a nitriding plasma by subjecting a gas to electromagnetic radiation having a frequency less than about 333 GHz in the presence of a plasma catalyst, wherein the plasma contains nitrogen;
   exposing the first surface region of the object to the plasma for a period of time sufficient to transfer at least some of the nitrogen from the plasma to the object through the first surface region; and
   substantially preventing exposure of a second surface region of the object to the plasma.

2. The method of claim 1, wherein the plasma catalyst includes at least one of a passive plasma catalyst and an active plasma catalyst.

3. The method of claim 1, wherein the plasma catalyst comprises nitrogen, and wherein the method further comprises adding nitrogen to the plasma by allowing the plasma to consume the plasma catalyst.

4. The method of claim 1, wherein the plasma catalyst includes at least one of powdered carbon, carbon nanotubes, carbon nanoparticles, carbon fibers, graphite, solid carbon, and any combination thereof.

5. The method of claim 1, wherein the plasma catalyst includes at least two different materials in amounts determined by a predetermined ratio profile.

6. The method of claim 1, wherein the plasma catalyst includes at least one of x-rays, gamma radiation, alpha particles, beta particles, neutrons, protons, and any combination thereof.

7. The method of claim 1, wherein the plasma catalyst includes at least one of electrons and ions.

8. The method of claim 1, wherein the plasma catalyst includes at least one of a nitrogen-containing compound, a metal, carbon, a carbon-based alloy, a carbon-based composite, an electrically conductive polymer, a conductive silicone elastomer, a polymer nanocomposite, an organic-inorganic composite, and any combination thereof.

9. The method of claim 1, wherein the initiating occurs in a cavity, and wherein the gas has an initial pressure level of at least about 760 Torr.

10. The method of claim 1, wherein the exposing is performed at a pressure of at least about 760 Torr.

11. The method of claim 1, further comprising diffusing the nitrogen into the object below the first surface region.

12. The method of claim 11, wherein the diffusing occurs up to a depth of between about 0.01 inches and about 0.1 inches.

13. The method of claim 1, wherein the initiating occurs using a time-averaged radiation energy density below about 10 W/cm$^3$.

14. The method of claim 1, further comprising:
   positioning the object within a cavity such that the second surface region is separated from an inner wall of the cavity by a distance of less than about 25% of the wavelength of the radiation.

15. The method of claim 1, further comprising positioning the object with respect to a cavity such that the first surface region is located within the cavity and the second surface region is located outside of the cavity.

16. The method of claim 1, further comprising mode-mixing the radiation.

17. The method of claim 1, wherein the exposing comprises:
   supplying the radiation into a cavity; and
   supplying the gas into the cavity.

18. The method of claim 1, further comprising applying a DC bias to the object.

19. The method of claim 18, wherein the DC bias is a pulsed DC bias.

20. The method of claim 1, further comprising introducing the nitrogen into the plasma by supplying a nitrogen-containing gas to the plasma.

21. The method of claim 1, wherein the initiating further comprises introducing the nitrogen into the plasma after the plasma is formed.

22. The method of claim 21, wherein the introducing comprises providing at least one of a solid material containing nitrogen and a gaseous material containing nitrogen to the plasma.

23. The method of claim 1, wherein the object includes iron.

24. The method of claim 1, further comprising heating at least the first surface region of the object via the plasma to between about 400° C. and about 650° C.

25. The method of claim 1, further comprising heating at least a portion of the object at a rate of at least about 400° C. per minute until the first surface region reaches a temperature of at least about 400° C.

26. The method of claim 1, wherein the exposing further comprises moving the first surface region of the object with respect to the plasma.

* * * * *

UNITED STATES PATENT AND TRADEMARK OFFICE
CERTIFICATE OF CORRECTION

| | |
|---|---|
| PATENT NO. | : 7,465,362 B2 |
| APPLICATION NO. | : 10/513607 |
| DATED | : December 16, 2008 |
| INVENTOR(S) | : Devendra Kumar et al. |

It is certified that error appears in the above-identified patent and that said Letters Patent is hereby corrected as shown below:

Column 3, line 28, "397,  10/513,605" should read --397, U.S. Patent Application No. 10/513,605--; and Column 13, line 54, "Iqniting" should read --Igniting--.

Signed and Sealed this
Fifteenth Day of February, 2011

David J. Kappos
*Director of the United States Patent and Trademark Office*